United States Patent
Torborg, Jr. et al.

[11] Patent Number: 5,936,616
[45] Date of Patent: Aug. 10, 1999

[54] METHOD AND SYSTEM FOR ACCESSING AND DISPLAYING A COMPRESSED DISPLAY IMAGE IN A COMPUTER SYSTEM

[75] Inventors: John G. Torborg, Jr., Redmond; James E. Veres, Woodinville; Om Kumar Sharma; George Easton Scott, III, both of Redmond; William Chambers Powell, III, Seattle, all of Wash.

[73] Assignee: Microsoft Corporation, Redmond, Wash.

[21] Appl. No.: 08/695,163

[22] Filed: Aug. 7, 1996

[51] Int. Cl.$^6$ ................................................. G06F 12/02
[52] U.S. Cl. ........................ 345/202; 345/507; 711/118
[58] Field of Search ........................... 345/202, 507–509, 345/513; 711/118

[56] References Cited

U.S. PATENT DOCUMENTS

| | | | |
|---|---|---|---|
| 5,179,651 | 1/1993 | Taaffe et al. | 345/202 |
| 5,263,136 | 11/1993 | DeAguiar et al. | 345/511 |
| 5,450,562 | 9/1995 | Rosenberg et al. | 711/119 |
| 5,740,278 | 4/1998 | Berger et al. | 382/232 |
| 5,796,864 | 8/1998 | Callahan | 382/166 |

OTHER PUBLICATIONS

*JPEG Still Image Data Compression Standard*, by William B. Pennebaker and Joan L. Mitchell, Chapter 5–7, pp. 65–134, 1993.

*The Data Compression Book*, by Mark Nelson, Chapter 11, pp. 347–373, 1992.

*Primary Examiner*—Jeffery Brier
*Assistant Examiner*—Vincent E. Kovalick
*Attorney, Agent, or Firm*—Klarquist Sparkman Campbell Leigh & Whinston LLP

[57] ABSTRACT

A display controller, implemented in software or hardware, maintains the primary display image visible on a computer monitor in compressed subregions or chunks. The controller emulates a conventional frame buffer by making the compressed image appear as if it has a linear address space. Most of the image is compressed and the remainder is selectively decompressed and cached to satisfy read and write requests. To display the image, the controller decompresses the display image's constituent subregions and buffers the decompressed data so that it can be scanned out to a display monitor.

20 Claims, 14 Drawing Sheets

*Virtual Frame Buffer Layout*

METHOD AND SYSTEM FOR ACCESSING AND DISPLAYING A COMPRESSED DISPLAY IMAGE IN A COMPUTER SYSTEM

FIELD OF THE INVENTION

The invention generally relates to computer display architectures and methods, and more specifically relates to computer hardware and software for accessing and displaying a compressed display image.

BACKGROUND OF THE INVENTION

Computer systems such as a typical desktop personal computer (PC) or workstation generally use a frame buffer to store image data for each picture element on a display monitor such as a cathode ray tube (CRT) or Liquid Crystal Display (LCD). Each picture element on the monitor's screen has a corresponding instance of image data commonly referred to as a "pixel." To convert the image data into an image visible on the screen, a display controller periodically reads the pixels in the frame buffer (usually around 60–75 times per second) and converts them into signals used to energize the picture elements on the screen.

To change the display image, the host processor of the computer modifies the pixels in the frame buffer. For instance, in conventional PC architectures, the computer issues read and write requests to a linear address space assigned to the frame buffer to read pixels and write new pixels into the frame buffer. In most computers, the operating system includes a software interface to the display hardware. Software executing in the computer can invoke functions in this interface to modify the display image. The software interface, in turn, communicates with the display hardware. For example, a program may invoke a bit block transfer function in the software interface to copy a new block of pixels to the frame buffer. The software interface translates this request into write requests to modify the contents of the frame buffer.

For the past several years, there has been a growing trend to make graphical displays more user friendly and realistic, and there is an increasing demand for applications with more compelling graphics and visual effects. To meet these demands, display hardware and software have to support higher resolution displays and a wider variety of colors. Unfortunately, high resolution color images require a great deal of memory and memory bandwidth, which increases the cost of the computer system.

One common way to support color displays with less memory is to use a color table or palette. A color table is an array of colors, where each color is typically represented by a Red, Green and Blue component. Each of these components is customarily represented by an 8 bit number. Rather than storing 24 bits for each pixel, each pixel represents an index into the color table. The display controller looks up the color value for each pixel as it generates the display's control signals. The color table, therefore, allows the computer to support a reasonable variety of colors while reducing the amount of memory to implement a frame buffer.

The color table approach reduces memory requirements, but is inherently limited because the table only provides a limited number of colors to choose from. An 8 bit index can only support 256 colors. While reducing the number of bits per pixel saves memory, it tends to decrease image quality.

Higher resolution workstations are capable of displaying from 1 to 2 million pixels for 24 bit per pixel (bpp) formats. These systems can achieve higher fidelity images because each pixel has 8 bits each for RGB components. These systems are expensive, however, because they typically use a frame buffer with enough memory to store a high resolution display image in 24 bpp format.

The use of a conventional frame buffer to store data for each picture element on the display screen is a major limitation of existing systems because it requires a great deal of memory. One solution is to use a different architecture which does not require a conventional frame buffer. However, it is difficult to change architectures because most of the operating systems and graphics support software is designed to interface with a conventional frame buffer that has a linear address space. New architectures can render current operating system and graphic support software obsolete.

There is a need, therefore, for improved display hardware and software that provides high quality images without increasing memory requirements and causing widespread compatibility problems.

SUMMARY OF THE INVENTION

The invention provides a display controller and related methods for accessing (e.g., reading and writing pixels) and displaying a compressed display image. The display image refers to the image visible on a display monitor of a computer system.

In one implementation of the invention, a display controller emulates a conventional frame buffer, yet maintains the display image in compressed form. The display controller includes a cache for storing decompressed subregions of the display image, a compressed memory for storing compressed subregions of the display image, and a virtual frame buffer controller for controlling read and write accesses to the cache and controlling which subregions are currently in decompressed form in the cache. The term, "subregions," refers to portions of the display image such as a block of pixels or a scan line that are maintained in compressed form and are selectively decompressed to satisfy a read or write request.

The display controller includes a compressor and decompressor to compress and decompress these subregions. The virtual frame buffer controller arranges for the decompressor to decompress a subregion to satisfy a request to access a pixel within a subregion. The types of compression can include lossy and lossless forms of compression for the subregions. In one implementation, the compressor can compress subregions into variable sized blocks using either a lossy or lossless form of compression on each subregion. The subregions are randomly accessible such that if the virtual frame buffer receives an access request for a subregion not in the cache, it can fetch the subregion having the requested pixel.

To make data written to a decompressed subregion visible on the display, the compressor compresses a modified subregion in the cache. A compositor is responsible for controlling the display of the compressed display image. The compositor decompresses the compressed display image and converts it into a format compatible with a display monitor. As an optimization, the compositor can merge a subregion in the cache with a corresponding decompressed chunk.

To maintain compatibility with existing operating systems, the virtual frame buffer controller makes the display image appear as if it resides in a linear address space. When it receives an access request, it determines whether the cache currently holds the subregion needed to satisfy the request. If so, it directs the request to address in the cache.

If not, it rejects the request and initiates a fetch and decompress of the corresponding compressed subregion.

As an optimization for write requests, the virtual frame buffer can allow a write to the cache without actually decompressing a corresponding compressed subregion until later. The controller keeps track of which new pixels overwrite pixels in the compressed display image and merges these new pixels with the compressed image in the background.

The display controller can be implemented in a variety of ways. For example parts of the controller such as the virtual frame buffer controller can be implemented in software while other parts can be implemented in hardware.

The invention provides several advantages. It reduces memory requirements in computer display architectures because the display image is stored in compressed form, and therefore, it occupies less memory than a frame buffer used to store an entire frame of a decompressed display image. The memory bandwidth required to access the display image is also greatly reduced since it requires less bandwidth to transfer compressed data as opposed to decompressed data.

In addition, the virtual frame buffer control used to control access to the compressed display image maintains compatibility with existing display software because it can support linear addressing used to read or write pixels to a conventional frame buffer. As such, operating system software designed to controls access to a conventional frame buffer does not need to be modified to read and write pixels to the compressed display image.

Further features and advantages of the invention will become apparent from the following detailed description and accompanying drawings.

BRIEF DESCRIPTION OF THE DRAWINGS

FIG. 8 is a diagram of a specific format of a virtual frame buffer.

DETAILED DESCRIPTION

Figure 1:
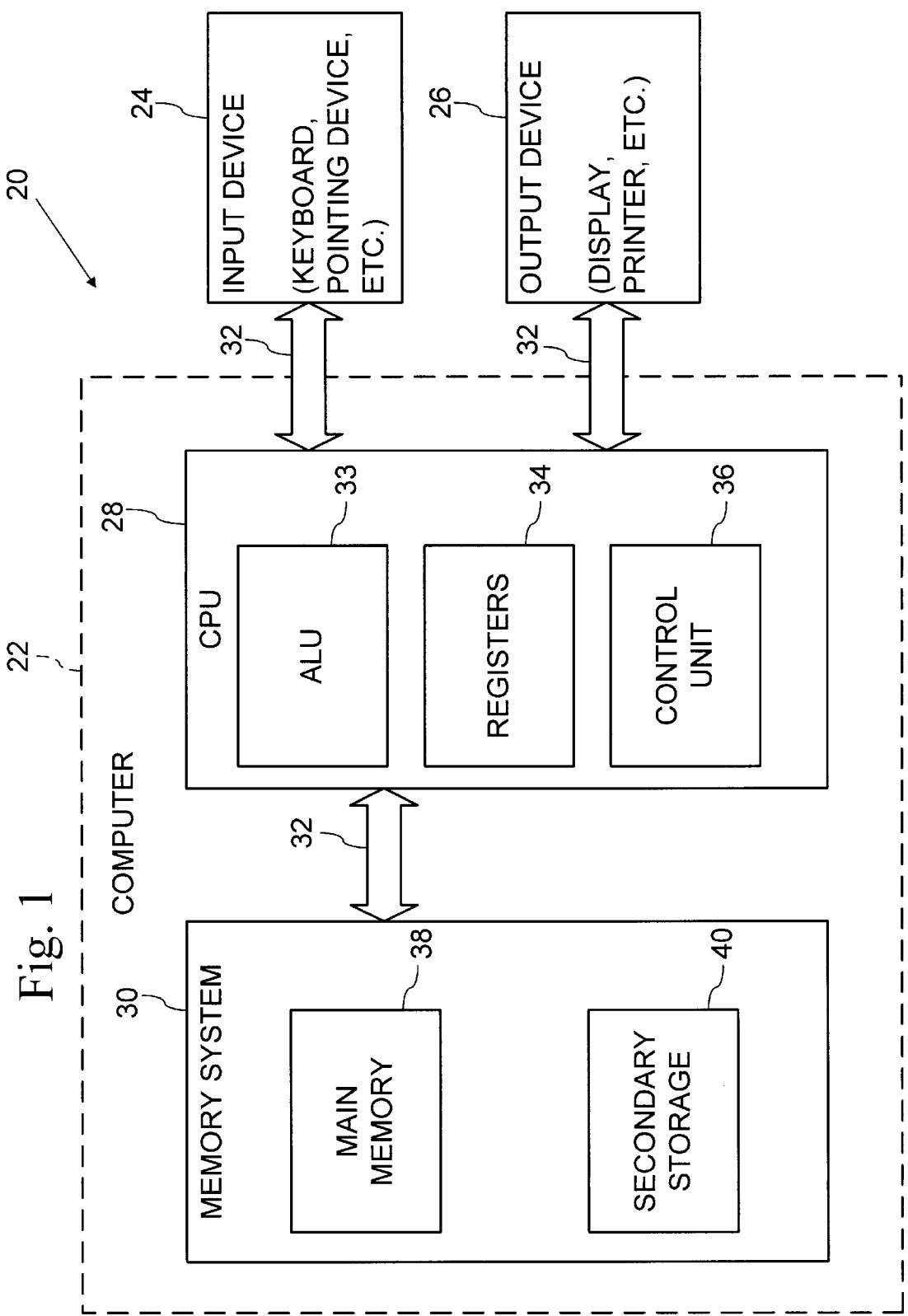
FIG. 1 is a general block diagram of a computer system 20 in which the invention can be implemented.

FIG. 1 is a general block diagram of a computer system 20 in which the invention can be implemented. The computer system 20 includes as its basic elements a computer 22, one or more input devices 24 and one or more output device 26 including a display device. Within this general architecture of a computer system, the support for accessing a compressed frame buffer can be implemented using the resources of the computer, a display controller connected to the computer, or a combination of both.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

The CPU executes graphics support software in the operating system that expects to access the display image as if it resided in a conventional frame buffer. In other words, the graphics software executing in the host processor does not have to be aware that the display image is actually stored in compressed form. The graphics software does not have to be modified to access the compressed display image, but rather, can use a conventional linear address scheme to read and write pixels to the display image.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some computer display architectures, portions of main memory 38 may also be used for displaying images through a display device.

Below we sometimes refer to software implementations of the invention or aspects of the invention. This software can be implemented in a program or programs, each comprising a series of instructions stored on a computer-readable medium. The computer-readable medium can be any of the memory devices, or a combination of the memory devices described above in connection with main memory and secondary storage.

Input device 24 and output device 26 are typically peripheral devices connected by bus structure 32 to computer 22. Input device 24 may be a keyboard, pointing device, pen, joystick, head tracking device or other device for providing input data to the computer.

The output device 26 represents a display device for displaying images on a display screen as well as a display controller for controlling the display device. In addition to the display device, the output device may also include a printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the computer industry.

Figure 2:
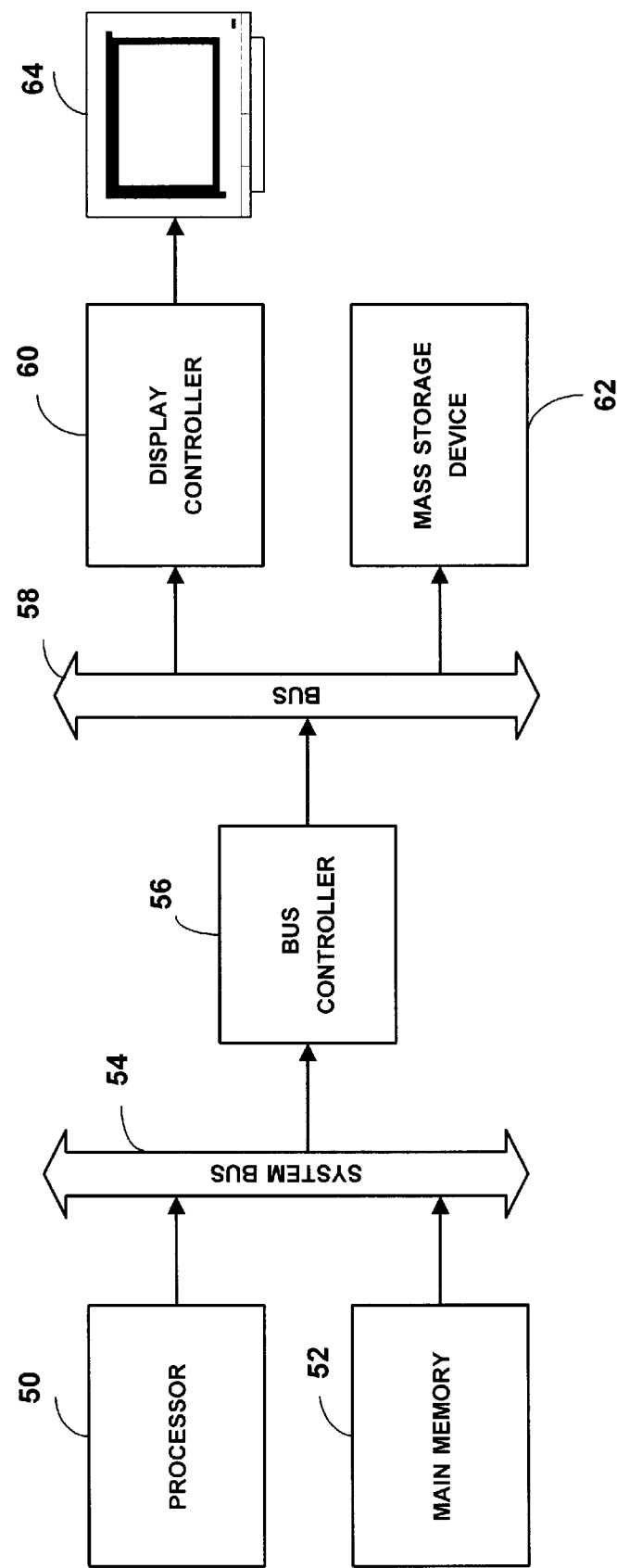
FIG. 2 is a block diagram illustrating a more specific computer architecture and showing the relationship between a display controller and a host computer in this architecture.

FIG. 2 is a block diagram illustrating a display controller in a computer architecture commonly found in desktop personal computers. This architecture includes a microprocessor 50, main memory 52, system bus 54, bus controller 56 and expansion bus 58. The processor 50 runs the operating system and application programs. The specific type of processor used in this type of architecture varies. A few common examples include the Pentium or Pentium Pro processors from Intel Corporation, microprocessors in the MIPS family from Silicon Graphics, Inc., and the PowerPC from Motorola.

The microprocessor 50 communicates with the main memory 52, and the bus controller 56 over the system bus 54. In this particular architecture, the bus controller allows the host microprocessor to communicate with plug in boards that plug into the expansion bus 58 as well as devices that are connected to the bus 58 directly on the host processor mother board. One implementation of the invention described below is particularly suited for PCs equipped with a PCI expansion bus, but it can be adapted to other bus architectures as well, including an EISA bus, VESA local bus, and NuBUS. The devices on the expansion bus 58, including the display controller 60 and mass storage device 62 communicate with the host processor 50 and main memory via the expansion bus 58 and bus controller 56.

The primary function of the display controller 60 is to generate a display image on a display monitor 64. As explained in further detail below, the display controller design can vary from implementation to implementation. For example, some display controllers include some form of memory such as DRAM or VRAM to implement a frame buffer. Other display controllers utilize a portion of main memory to implement the frame buffer. A common feature of each of these designs is their ability to convert pixels in a display image into a stream of analog image data used to refresh the display screen on the monitor 64. The monitor 64 is a conventional display device such as a cathode ray tube (CRT) device, a liquid crystal display (LCD) device or some other form of display device.

Figure 3:
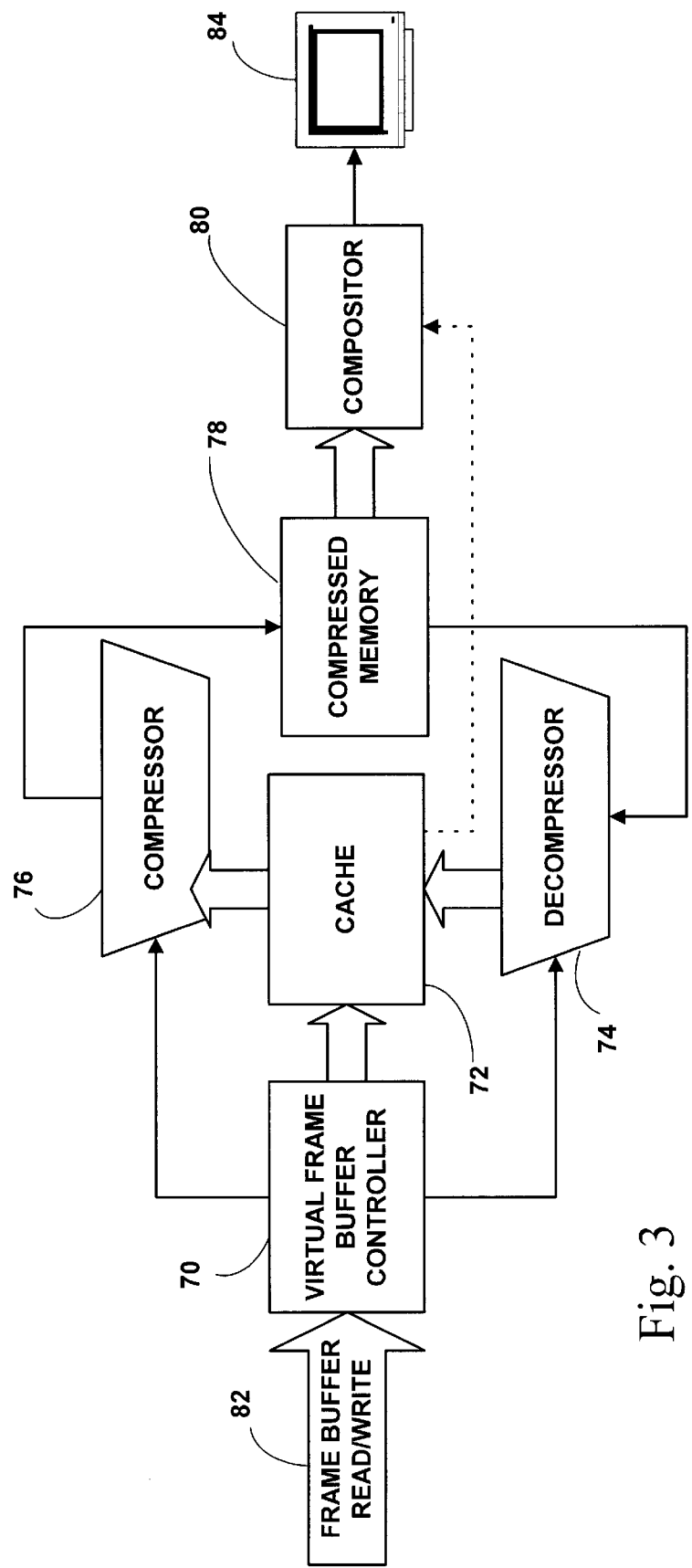
FIG. 3 is a general block diagram illustrating an implementation of a compressed display image controller.

FIG. 3 is a general block diagram illustrating an implementation of a compressed display image controller. The compressed display image controller includes a virtual frame buffer controller (VFB controller) 70, cache memory 72, a decompressor 74, a compressor 76, compressed memory 78, and a compositor 80. The VFB controller receives requests to access one or more pixels in a display image and in response controls access to decompressed pixel data in the cache 72. With respect to an entity requesting read or write access to the display image, the VFB controller emulates a conventional frame buffer with a linear address space.

Cache 72 temporarily stores a decompressed portion of the display image. The VFB controller 70 manages the contents of the cache and instructs the decompressor 74 to fetch and decompress compressed portions of the display image as necessary to satisfy read or write requests. As part of its cache management, the VFB controller 70 also issues control signals to the compressor to instruct it to compress and store portions of the display image in compressed memory 78.

The decompressor 74, and compressor 76 execute complimentary forms of decompression and compression, respectively, on subregions of the display image. In one implementation, for example, the subregion is a 32×32 pixel chunk of the display image. However, the size of the subregion can vary in dimension. For example, the subregion can be a single scan line with a height of one pixel and a width of one scan line of the display monitor or the subregion can be a square or rectangular block of pixels.

As explained in further detail below, the decompressor and compressor preferably decompress and compress these subregions of the display image into variable sized compressed subregions. Either a lossless or a lossy form of compression can be used in the compressors. Examples of lossless forms of compression include Huffman coding, Run Length coding, arithmetic coding, or some combination of these coding techniques. Examples of lossy compression include a discrete cosine transform (DCT) stage and a quantization stage. The DCT converts contiguous block of pixels into an array of spatial frequency components, and the quantization of those frequency components reduces the magnitude of the frequency components.

The form of compression and decompression employed in the compressor 76 and decompressor 74 can also include a combination of lossless and lossy compression techniques. This is advantageous since images of text or spreadsheets are better compressed using a lossless form of compression so the full detail of each character (letter or number) is retained thereby retaining the sharp image quality on each character. Realistic or "natural" images are compressed using a lossy form of compression to achieve higher compression factors (they take up less memory space). Realistic images can tolerate some loss of detail without noticeably degrading the image quality.

The compositor 80 retrieves compressed subregions of the display image, decompresses them, and combines the decompressed pixel data into a display image. The compositor includes a decompressor for decompressing compressed subregions of the display image, and a digital to analog converter for converting the pixel data into a format for display on display monitor 84.

As an optimization, the compositor can optionally combine decompressed pixel data in the cache 72 with pixel data that is decompressed from the compressed memory 78 and generate a display image on the display monitor 84. This is an optimization because it enables the compositor to merge decompressed pixel data in the cache directly with the corresponding subregion without an intermediate compression step.

The compressed frame buffer architecture illustrated in FIG. 3 can be implemented using a combination of host computer resources and display controller resources. For example, the VFB controller, compressor, and decompressor in FIG. 3 can be implemented in software executed in the host processor. The cache 72 and compressed memory 78 can be implemented in main memory of the computer. The compositor could be implemented in software, hardware or a combination of both. For example, to display the compressed image, host processor could decompress subregions and buffer them in main memory or some form of video memory. A Digital to Analog converter could then convert the buffered, decompressed display data into a format compatible with a monitor.

Alternatively, the architecture illustrated in FIG. 3 can be implemented in a display controller such as the display controller illustrated in FIG. 2. In this case, the VFB controller presents a linear address space on the peripheral bus, and the host processor would issue read and write requests to the virtual frame buffer over this bus.

Figure 4:
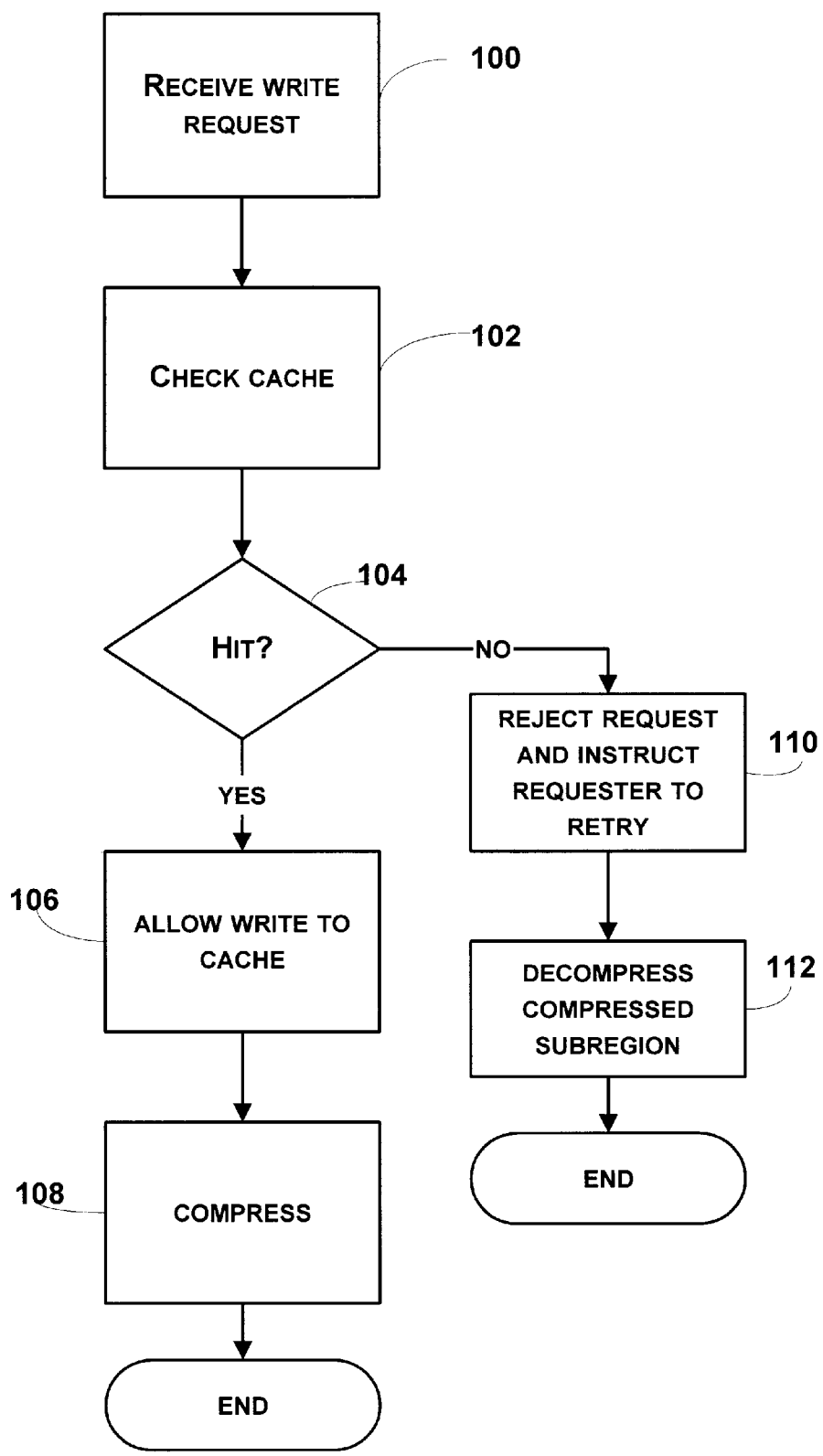
FIG. 4 is a flow diagram generally illustrating a method for writing pixels to a compressed display image.
Figure 5:
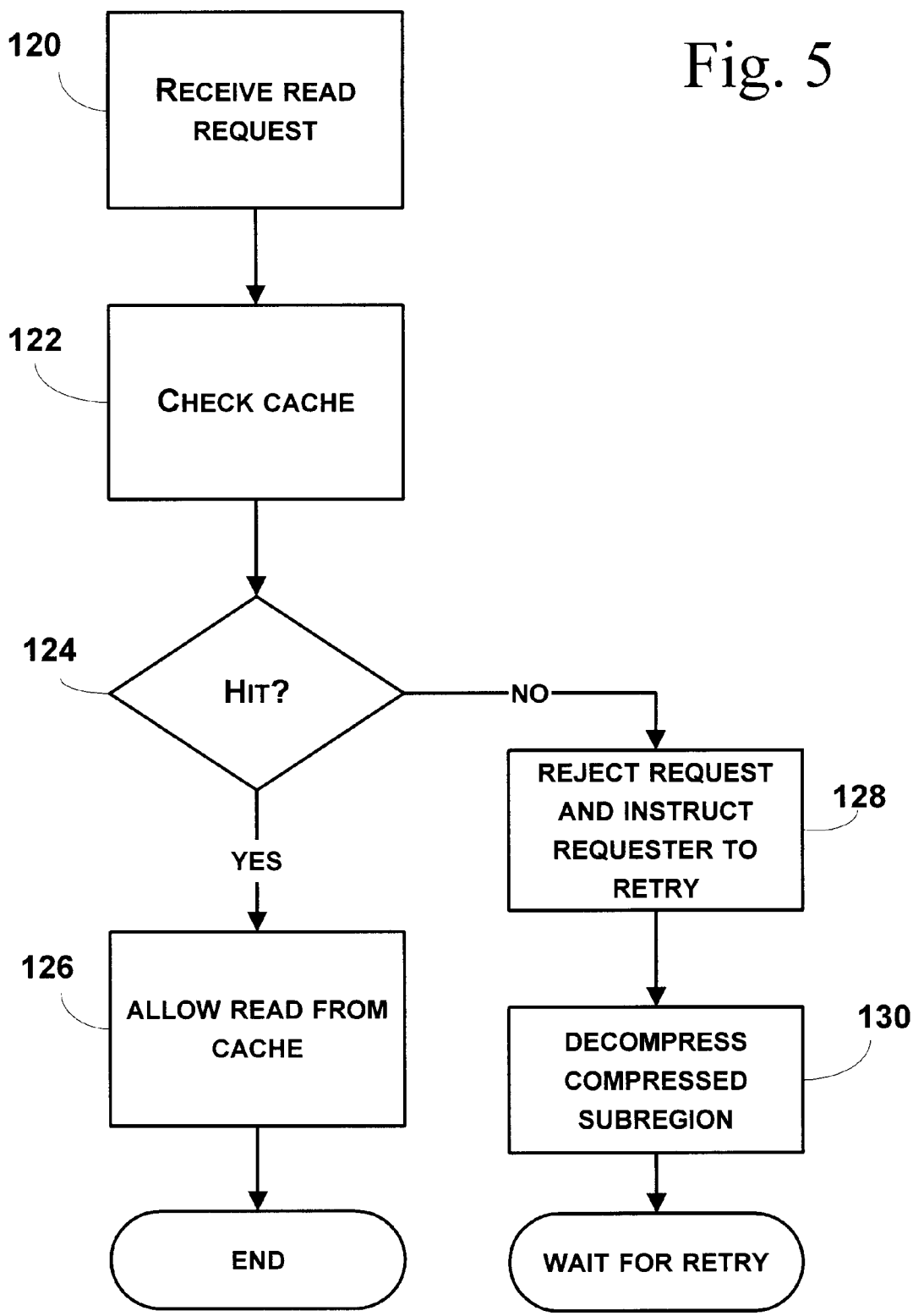
FIG. 5 is a flow diagram generally illustrating processing of a read request in one implementation.

FIGS. 4 and 5 are flow diagrams generally illustrating methods for processing read and write requests In an implementation of the virtual frame buffer. At a high level, the methods for writing and reading pixels in a compressed display image roughly parallel each other. However, requests to write pixels to the virtual frame buffer typically occur much more frequently than requests to read pixels. Performance of write operations can be improved by hiding the latency of decompressing subregions when a requested pixel is not in the cache. A read request requires that the requested pixel or pixels be accessible in the cache whereas pixels in a write request can be written to the cache first and then written to the compressed display image later.

FIG. 4 is a flow diagram generally illustrating a method for writing pixels to the compressed display image. Processing begins when the VFB controller receives a write request as shown in step 100. In response, the VFB controller checks the cache to determine whether the pixel location or locations that is needed to satisfy the write requests are currently located in the cache. The VFB controller maintains a data structure which stores a tag or other identifier indicating which subregions of the display are currently stored in the cache. If the subregion containing the pixel location or locations needed to satisfy the write request are located in the cache, then the VFB controller allows the write to occur by directing the write request to the appropriate location in the cache.

In order for the pixel data written to the cache to become part of the compressed display image, the VFB controller instructs the compressor to compress the subregion containing the newly written pixel data and store it in the compressed memory.

If after checking its data structures, the VFB controller determines that the cache does not contain the image subregion necessary to satisfy the write request, it rejects the request as shown in step 110. It then decompresses the compressed subregion containing the pixel or pixel locations needed to satisfy the write request. The software or hardware that issued the write request to the virtual frame buffer will continue to reissue the write request until it can be satisfied.

FIG. 5 is a flow diagram generally illustrating processing of a read request in one implementation. Processing begins when the VFB controller receives a read request as shown in step 120. In response, the VFB controller checks its data structures to determine whether the cache currently contains the pixel or pixel locations to satisfy the read request. If there is a cache hit, meaning that the cache currently includes decompressed pixel data to satisfy the read request, the VFB controller allows the read request to occur. The VFB controller re-directs the read request in the linear address space of the virtual frame buffer to a physical address in the cache.

In the case where the cache does not currently contain the pixel location to satisfy the read request, the VFB controller rejects the read request and then proceeds to fetch the compressed subregion of the display image containing the pixel needed to satisfy the read request. To accomplish this, the VFB controller instructs the decompressor to decompress this subregion in compressed memory and place it in the cache. The VFB controller then updates its data structures to indicate that the newly decompressed subregion is now present in the cache. It then waits for the requesting entity to reissue the read request.

To display the compressed display image on the display monitor, the compositor retrieves the compressed subregions of the display image from compressed memory, decompresses them, and combines them into a display image. One way to make newly written pixel data in the cache visible on the display monitor is to write the pixel data to a decompressed subregion of the display image located in the cache, compress that subregion, and then use the compositor to decompress and combine that subregion with other subregions to form the display image.

In cases where there would otherwise be a cache miss, the VFB controller can write pixel data to the cache without incurring the additional latency of decompressing a corresponding region of the display image and placing it in the cache. The VFB controller can allow the write to the cache to occur if it has allocated memory for this pixel write, and then at some later time it can merge newly written pixel data into the compressed display image.

As another optimization, pixel data written to the cache can be merged with a corresponding decompressed subregion in the compositor as the compositor generates the display image. This enables the display controller to write pixels and immediately display them on a display monitor before those newly written pixels become part of the compressed display image. To ensure that the compressed display image accurately reflects the display image on the monitor, pixel data written to the cache should ultimately be merged with the compressed display image.

Figure 6:
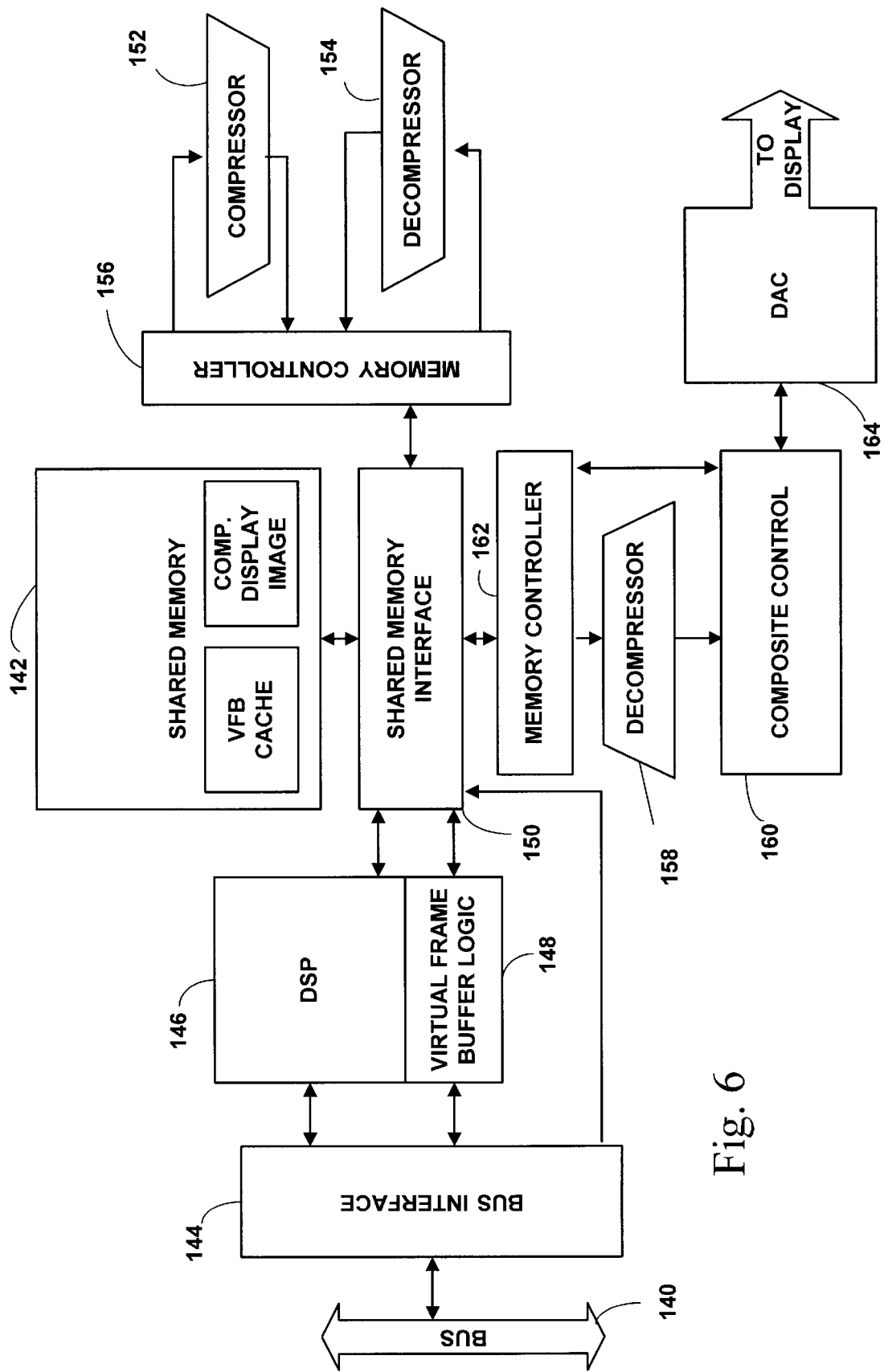
FIG. 6 is a block diagram illustrating one implementation of a display controller that maintains a display image in compressed form and manages access to the compressed display through a linear address space.

FIG. 6 is a block diagram illustrating one implementation of a display controller for compressed display image. This display controller can interface with a variety of computer architectures as depicted by the general nature of the computer architecture in FIG. 1. When coupled to a display monitor, this display controller corresponds to the output device 26.

FIG. 2 illustrates a more specific architecture where a display controller is connected to a host computer via an expansion bus. This particular display controller shown in FIG. 6 can be designed to interface with any of a number of computer architectures, and the specific architecture shown in FIG. 2 is only one example.

The display controller receives requests to write and read pixels in a frame buffer from the host processor via the expansion bus 140. These read and write requests are directed to a linear addressable frame buffer. One example of these read and write requests are read and write requests issued by the DIB engine in the Windows 95 Operating System from Microsoft Corporation.

The display controller in FIG. 6 emulates a conventional frame buffer with a linear address space. The display controller receives requests from the host to read and write pixels to this linear address space via the bus 140 and directs these requests to decompressed portions of the compressed frame buffer stored in a virtual frame buffer cache (VFB cache) located in shared memory 142.

The display controller communicates with the host processor through bus interface 144 to the bus 140 in the host computer. In this particular implementation, a number of components of the display controller can communicate with the bus 140 via this bus interface 144. These components include the digital signal processor (DSP) 146, virtual frame buffer logic (VFB logic) 148, and the shared memory 142. The bus interface 144 enables the host processor to communicate directly with the DSP 146, the VFB logic 148, and the shared memory 142.

Together, the DSP 146 and VFB logic 148 form one possible implementation of a VFB controller described in connection with FIG. 3. The VFB logic 148 receives read and write accesses to the virtual frame buffer via the bus interface 144. The VFB logic is responsible for determining whether there is a cache "hit" in response to a read or write request to the virtual frame buffer. If there is, it allows the read or write to occur and directs the request to the appropriate location in the cache, which is implemented in the shared memory 142. If there is a cache "miss," the VFB logic 148 is responsible for interrupting the DSP 146, which arranges for the compressed subregion needed to satisfy the request to be decompressed and placed in an area of decompressed shared memory serving as the virtual frame buffer cache. When the DSP determines that the transfer of the decompressed subregion to the cache is complete, it updates registers in the VFB logic to indicate that the decompressed subregion is now available.

The DSP and VFB logic are implemented in an application-specific integrated circuit (ASIC), including a DSP core, and additional logic, including the VFB logic. In addition to issuing instructions to compress and decompress subregions of the frame buffer, the DSP core in this implementation also sends control commands to a composite control 160 to describe the location of the compressed subregions of the display image. Examples of suitable DSPs to use for this particular implementation include the MSP-1 from Samsung Semiconductor and TriMedia from Phillips Semiconductor.

Alternative designs of the VFB controller are also possible, including using the host processor rather than processing resources on the display controller to support the functionality of the virtual frame buffer and compressed display image.

The shared memory 142 in this design implements both the decompressed cache (VFB cache) used to store a decompressed portion of the frame buffer, and compressed memory used to store compressed subregions of the frame buffer. In alternative designs, separate memory units can be used to implement the VFB cache and compressed memory. In this particular implementation, the shared memory 142 is comprised of 4 MB of RDRAM, which is implemented using 2 8-bit RAM bus channels. A variety of other types of memory and memory sizes can be used as well, including, for example, SDRAM or VRAM.

The shared memory interface 150 connects several components on the display controller to the shared memory and arbitrates access to the shared memory.

The VFB logic 148 together with the DSP 146 perform memory management of the compressed display image stored in shared memory 142. In this particular implementation, the shared memory includes both the VFB cache for storing decompressed subregions of the frame buffer, and compressed memory for storing compressed subregions of the frame buffer. While the specific size and shape of the subregion can vary, the subregions in this specific design are 32×32 pixel chunks. Each of the 32×32 pixel chunks are comprised of 16 8×8 pixel blocks. The compressor 152 and decompressor 154 compress and decompress each chunk in 8×8 pixel blocks.

In this particular implementation, the compressor 152 and decompressor 154 are implemented in an integrated circuit that interfaces with the shared memory through memory controller 156. The memory controller 156 manages direct memory access (DMA) transfers between the shared memory and the chip containing the compressor and decompressor 152, 154. The memory controller 156 also provides access to the control registers, and controls tokens that synchronize the DSP 146 and the memory controller 156 for the compressor and decompressor.

The memory controller 156 has a chunk buffer for storing a decompressed chunk. To compress a chunk from the VFB cache, the DSP 146 transfers it to the chunk buffer. The compressor then compresses the chunk in 8×8 pixel blocks, and the memory controller 156 transfers the compressed blocks to compressed memory. To decompress a chunk, the decompressor 154 decompresses the compressed blocks in the chunk and places the decompressed pixel data in the chunk buffer. The memory controller 156 then transfers the decompressed chunk to the VFB cache. To optimize pixel write operations, the memory controller 156 includes merge logic which reads pixels from the VFB cache and overwrites corresponding pixels in a corresponding decompressed chunk in the chunk buffer. Specifically the display controller merges a modified chunk in the VFB cache with its counterpart chunk from the display image, the DSP instructs the decompressor to decompress the counterpart chunk and place it in the chunk buffer. The merge logic then overwrites pixels in the chunk buffer with pixels from the modified, decompressed chunk in the VFB cache.

The compressor and decompressor 152, 154 support both a lossy and lossless form of compression on the 8×8 pixel blocks. The lossless form of compression includes Huffman and Run Length coding. The lossy form of compression includes both a lossy and lossless stage. The lossy stage includes a direct cosine transform (DCT) to convert an 8×8block of pixels into spatial frequency components and also includes a quantization step used to compress the spatial frequency components. In this particular implementation, the lossless stage is similar to the lossless formed with compression, and it includes Huffman and Run Length coding.

A variety of different compression and decompression techniques can be used. The specific form of compression and decompression used in this implementation is described in further detail below. However, it is important to note that a variety of other conventional compression techniques, as well as variations on the specific techniques described below, can be used in the alternative.

The display controller includes an additional decompressor 158 and composite control 160 which retrieve portions of the compressed display image from compressed memory and construct a display image. In this particular implementation, the decompressor 158, composite control 160, and a memory controller 162 are implemented in an integrated circuit chip that interfaces with the shared memory 142 through the shared memory interface 150. The memory controller 162 controls and arbitrates accesses to the shared memory 142 via the shared memory interface 150. The memory controller 162 includes memory for buffering pixels and commands from a shared memory.

The decompressor 158 on the compositing chip decompresses 8×8 pixel blocks of each chunk and caches this decompressed data within the composite control 160. In this particular implementation, the decompressor is capable of decompressing compressed blocks that are compressed using either the lossless or lossy form of compression.

The composite control is responsible for managing retrieval of compressed chunks, and for constructing a display image. In this particular implementation, the composite control 160 fills a compositing buffer with a decompressed scan line band. The width of the compositing buffer in this particular implementation is a scan line and the height is 32 pixels, which corresponds to a horizontal row of chunks in the display image. The composite control 160 has double buffered compositing buffers so that it can fill one while the other is being scanned out to the display. To display pixels on a display monitor, the composite control 160 issues control signals to a digital-to-analog converter (DAC) 164, which scans pixels from one of the compositing buffers and converts them into a format compatible with the monitor.

As introduced above with reference to FIG. 3, decompressed portions of the display image in the cache can be merged directly with compressed subregions of the display image to make pixels in the cache immediately visible on the display monitor. The composite control 160 supports merging by combining a chunk stored in the cache in shared memory with a decompressed chunk as it fills the compositing buffer. One way to support this merging is to encode an overwrite flag with each pixel written to the cache. The composite control 160 looks for this overwrite flag and determines whether it should write the new pixel in the VFB cache over a corresponding pixel from the compressed display image to the compositing buffer. By selectively overwriting pixels in this manner, the composite control merges the newly written pixel data in the virtual frame buffer cache with a compressed portion of the display image.

The composite control 160 in conjunction with the decompressor 158 can construct a decompressed image from losslessly compressed image data (such as spreadsheets or word processing documents), lossily compressed image data (such as natural images), and uncompressed image data (such as uncompressed image data from conventional desktop applications). As explained in detail below, blocks within a chunk can be decompressed, lossily compressed, or losslessly compressed. Thus, the composite control can process a display image with any combination of these image data formats. A related feature of the display image format is the ability to vary the compression ratio per block using either lossy or lossless forms of compression per block or varying the quantization factors applied to spatial frequency components within a block.

Figure 7:
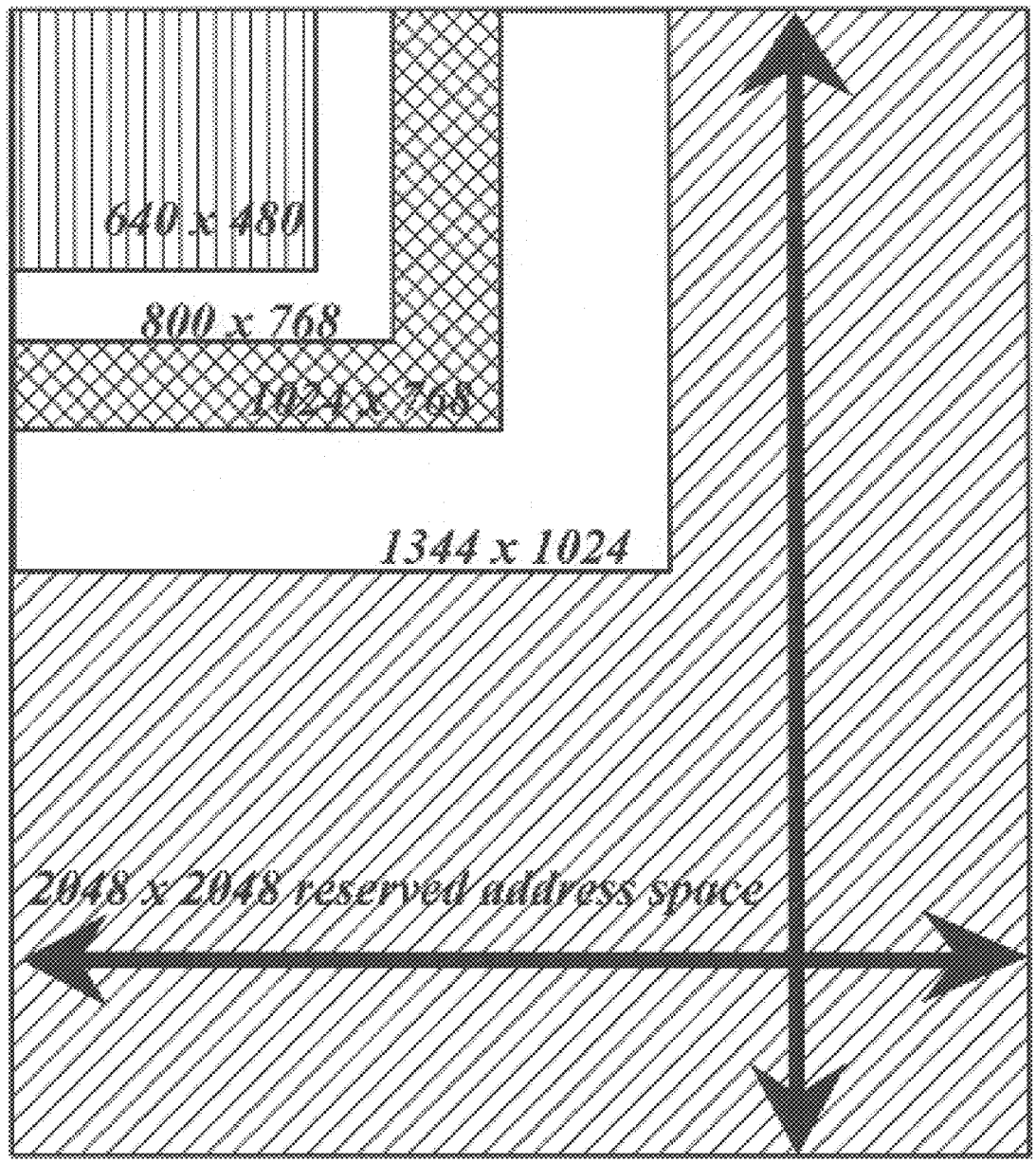
FIG. 7 is a diagram illustrating the virtual frame buffer supported in the display controller of FIG. 6.

FIG. 7 is a diagram illustrating one implementation of the virtual frame buffer supported in the display controller of FIG. 6. In this VFB design, the VFB logic emulates a 2K×2K pixel frame buffer residing in the address space of the host computer's expansion bus. As shown in FIG. 7, this virtual frame buffer supports a variety of different display resolutions, including 640×480, 800×600, 1024×768, and 1344×1024 (each resolution represents horizontal by vertical pixels). The display controller supports each resolution with 8, 16, or 24 bits per pixel. Pixels in the 8 bits/pixel format represent an index into a color look-up table or palette, which comprises an array of red, green, and blue (RGB) color triplets. Pixels in the 16 bits/pixel format include 4 bits each of red, green, and blue, and also include a single alpha bit. Finally, pixels in the 24 bits/pixel format include 8 bits each of red, green, and blue, and can also include an additional 8 bits of alpha. This last format is sometimes referred to as 32 bits/pixel if it includes 8 bits of alpha. While we specifically refer to RGB colors, the invention applies to other color spaces and pixel formats as well.

As shown in FIG. 7, the upper left corner of the virtual frame buffer (address 0) always starts at the lowest address of the frame buffer, in this implementation. The second row always starts at 2048×BPP (2048×the number of bits per pixel).

Figure 8:
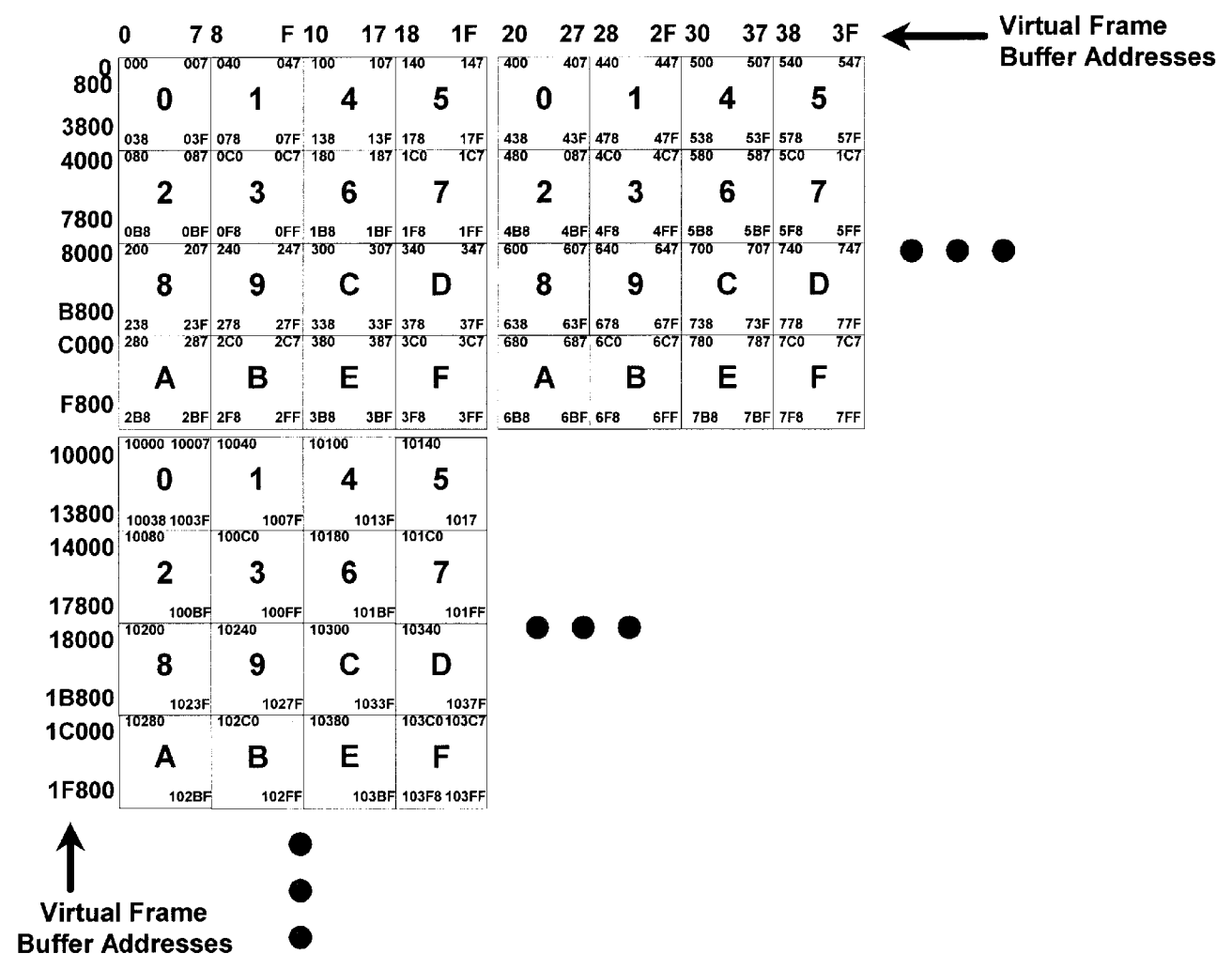

FIG. 8 is a diagram illustrating the virtual frame buffer of FIG. 7 in terms of the chunks in the virtual frame buffer and the individual 8×8 pixel blocks in each chunk. Each of the 32×32 pixel chunks in the display image are composed of 16 8×8 pixel blocks according to the pattern shown in FIG. 8. While this diagram illustrates a specific implementation of the subregions in a display image, the specific implementation of the subregion configuration can vary. For example, a subregion can be comprised of a single scan line, a series of scan lines, or a pixel block of varying dimensions.

The display controller of FIG. 6 emulates a virtual frame buffer shown in FIGS. 7 and 8 by re-directing read and write requests to the linear address space of the virtual frame buffer to a physical address space in the virtual frame buffer cache. To implement this cache in shared memory, the display controller sets aside a section of shared memory for storing decompressed 32×32 pixel chunks. The VFB logic maintains a data structure to keep track of which decompressed chunks are currently present in the cache. In response to a request to access a pixel in the virtual frame buffer, the VFB logic determines whether a pixel is located in one of the decompressed chunks in the cache. If it is, the VFB logic directs the memory access to the physical location in the cache where the pixel is stored. If the requested pixel is not in the cache, VFB logic interrupts the DSP, which arranges for the appropriate chunk to be retrieved from compressed memory, decompressed, and placed in the cache.

Figure 9:
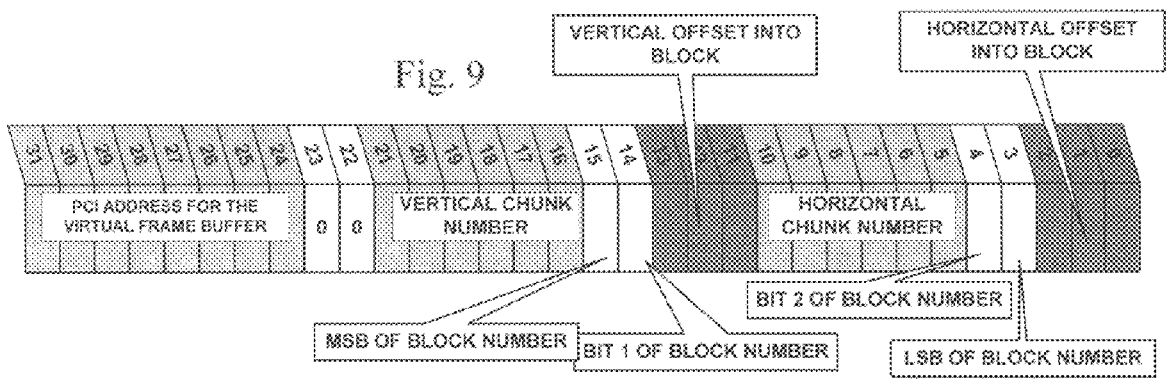
FIG. 9 illustrates the PCI address format for pixels in 8 bpp format.
Figure 10:
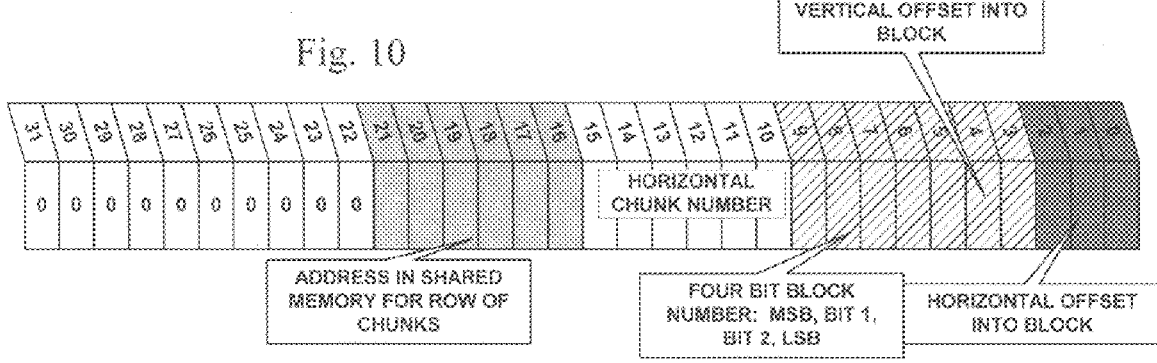
FIG. 10 illustrates the shared memory address format for pixels in 8 bpp format.
Figure 11:
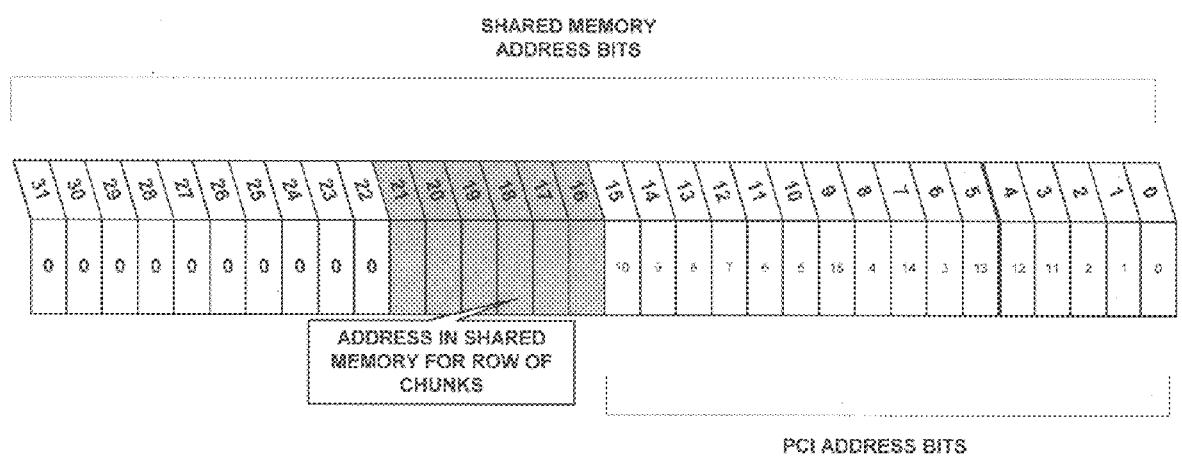
FIG. 11 illustrates how the PCI address format shown in FIG. 9 maps to the shared memory address format in FIG. 10.

FIGS. 9–11 illustrate how the display controller maps a linear address to the virtual frame buffer to the physical address in shared memory. In this implementation for the PCI bus, the VFB logic extracts the address of a pixel in the virtual buffer from the PCI address format. Specifically in this case, the VFB logic extracts the address of a pixel in a chunk. As illustrated in FIG. 8, a chunk is comprised of blocks arranged in a pre-defined order, and each block is comprised of 64 pixels, also arranged in a predefined order.

The VFB logic converts the linear address of a location in the virtual frame buffer to an address of a pixel in the shared memory format. Specifically, the VFB logic rearranges the bits in the linear address to match the storage order of pixels into blocks and blocks into chunks according to chunk format. The software that reads and writes pixels to the virtual frame buffer, therefore, does not need to know the chunk format, but rather can use a conventional linear address as if the pixels in the display image reside in a conventional frame buffer.

FIG. 9 illustrates the PCI address format for pixels in 8 bpp format. FIG. 10 illustrates the shared memory address format for pixels in 8 bpp format. Finally, FIG. 11 illustrates how the PCI address format shown in FIG. 9 maps to the shared memory address format in FIG. 10. This particular example specifically illustrates an example for 8 bpp format. The addresses for 16 and 32 bpp formats are quite similar, except that the VFB logic shifts bits 21:0 left by one bit for pixels in 16 bpp format and by two bits for pixels in 32 bpp format (8 bits each of RGB and alpha).

The vertical chunk number shown at bits 21:16 in FIG. 9 represents the row number of a row of chunks in the virtual frame buffer. The vertical chunk number maps to the address in shared memory for a row of chunks as shown in FIG. 10 at bits 21:16.

The PCI address format of FIG. 9 also encodes a four bit block number that identifies the block within a chunk. This block number is encoded at bits 15:14 and 4:3 in the example shown in FIG. 9. The vertical and horizontal offsets shown in FIG. 9 identify a pixel location or address within a block.

Figure 12:
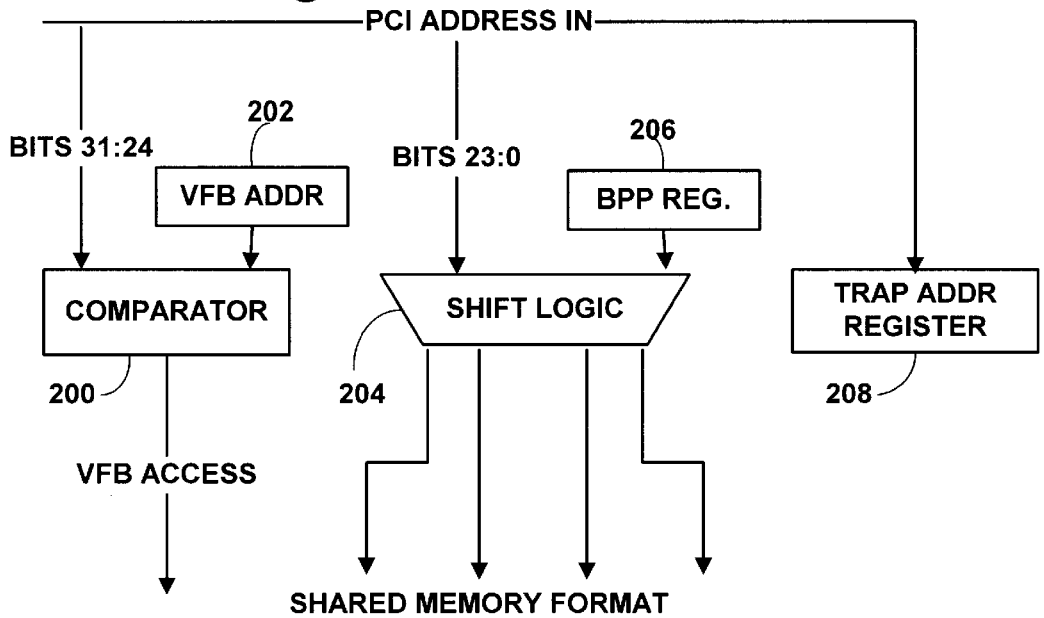
FIG. 12 is a diagram illustrating an implementation of an address decoder in the virtual frame buffer logic of FIG. 6.

FIG. 12 is a diagram illustrating an implementation of an address decoder in the VFB logic. The functions of the address decoder include: 1) detecting an access to the virtual frame buffer, 2) extracting the shared memory address as illustrated in FIGS. 9–11, and 3) and trapping the PCI address in a trapped address register.

The address decoder includes comparator logic 200 for determining whether an access on the bus is a request to access the virtual frame buffer. The comparator 200 compares the PCI address with the virtual frame buffer address stored in a virtual frame buffer address register (VFB ADDR) 202. The VFB address is the starting PCI address of the virtual frame buffer. If the PCI access request is destined for the virtual frame buffer, the comparator output indicates that the PCI access is a VFB access.

The shift logic 204 in the address decoder extracts data needed to identify the chunk and pixel address. The shift logic shifts the PCI address by 0, 1, or 2 bits based on the pixel format specified in a bytes per pixel register 206. The bytes per pixel register 206 stores flags identifying whether the pixel format is 4, 2, or 1 byte per pixel (32, 16, or 8 bits per pixel). The shift logic maps the PCI address format into the shared memory address format as shown in FIGS. 9–11. By re-arranging the bits in the PCI address, the shift logic converts the PCI address format to the shared memory format. Once in the shared memory format, cache control logic then extracts the horizontal and vertical chunk numbers, the four bit block number, and the vertical and horizontal block offset.

The address decoder shown in FIG. 12 traps the PCI address when the VFB request misses the virtual frame buffer cache. In this implementation, the trapped address register 208 latches the first PCI address that misses the virtual frame buffer cache. Once the VFB logic captures an address in this register, it rejects further PCI accesses that miss the virtual frame buffer, and it does not capture a new PCI address until the pending interrupt is cleared.

The VFB logic can capture a new PCI address once the DSP has cleared the pending interrupt. In this implementation, the DSP allows the VFB logic to capture another PCI address by clearing an interrupt status register when it has completed decompressing a chunk. The interrupt status register is a register in the VFB logic used to store information about a pending interrupt. The interrupt status register store flags indicating that a virtual frame buffer access has missed the virtual frame buffer cache, that an interrupt is pending (e.g. an interrupt of the DSP to fill the cache), which portion of the cache is currently being used; and whether the cache miss occurred in response to a read or write request.

This implementation also includes an interrupt mask register. When an interrupt is cleared, the VFB logic can capture the same PCI address again. This case is likely because the time required to decompress a chunk and place it the cache is likely to be much longer than the PCI bus retry time. Software executing in the host processor or DSP can elect to disable future PCI address trap interrupts while it is processing the current PCI miss by setting (or clearing) a flag in the interrupt mask register. The interrupt mask register, therefore, can either enable or prevent the VFB logic from raising an interrupt based on the data value stored in it.

After decoding the address of a VFB access, the VFB logic determines whether the chunk containing that address is currently stored in a virtual buffer cache. In other words, it determines whether there is a cache hit or miss for the chunk containing the requested pixel. The VFB logic maintains a data structure that tracks which portions of the frame buffer are currently in the cache. In this particular implementation, the VFB controller reserves enough of the shared memory to store a row of decompressed chunks. The virtual frame buffer supports two "cache slots" corresponding to two full rows of decompressed chunks. Any one of the chunks in these two slots can be active at any one time.

While the VFB logic specifically supports two rows of decompressed chunks, software executing in the DSP (or host) may elect to hold more than two rows of decompressed chunks. Maintaining additional decompressed memory enables the software to decompress new chunks or compress chunks with newly written pixels in the background. It is important to note that this design of the cache is only one possible implementation, and the amount of memory allocated for the virtual buffer cache can vary. If the sub-regions have a different format than a chunk, for example, the cache data structures and size would differ to accommodate the different format.

Figure 13:
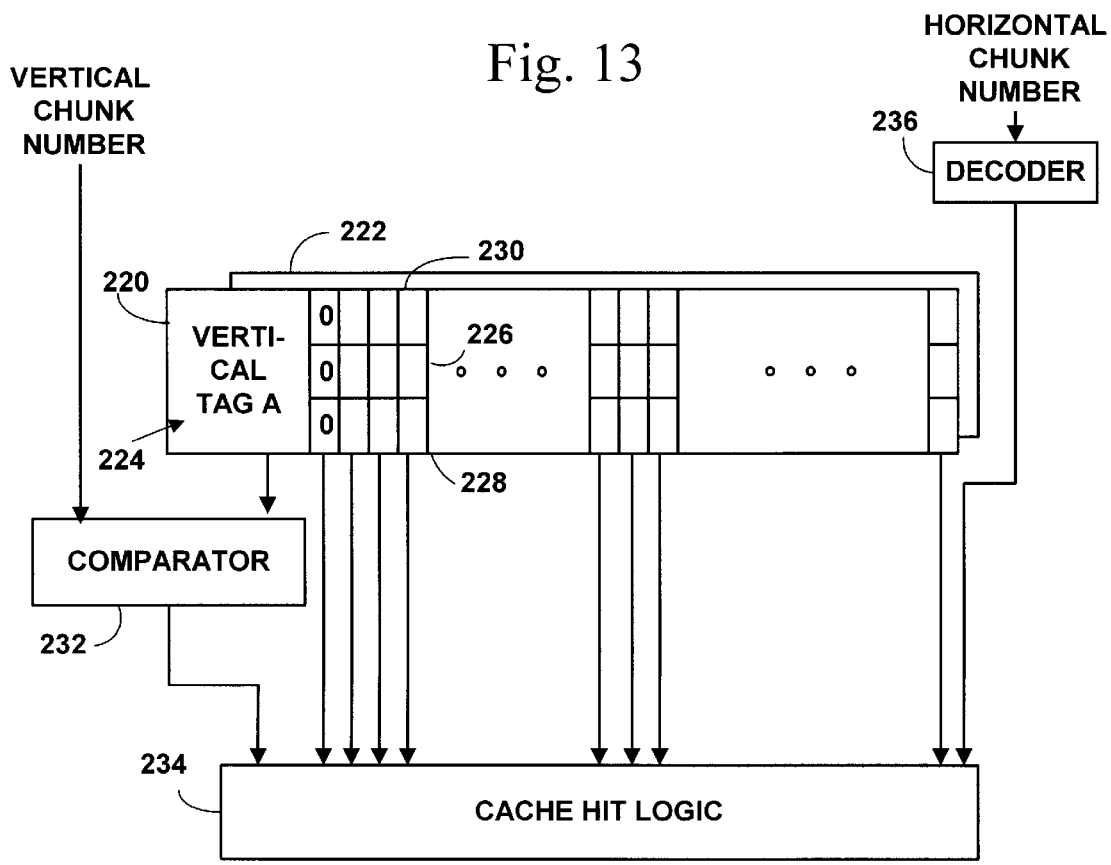
FIG. 13 is a block diagram illustrating cache logic in one implementation of the virtual frame logic of FIG. 6.

FIG. 13 is a block diagram illustrating cache logic in one implementation of the VFB controller. The VFB logic shown here includes two cache slot stores: cache slot A 220 is shown in the foreground, and cache slot B 222, which has the same structures as cache slot A, is shown in the background. Cache slots A and B are each associated with a vertical tag 224 that identifies the row of chunks stored in this cache "slot."

In addition to the vertical tags, the VFB logic maintains additional information about the chunks in each cache slot. The logic includes a shared memory pointer for each cache slot that points to the starting address of a row of decompressed chunks. As shown in FIG. 10 and FIG. 11, the VFB logic uses this starting address along with the horizontal chunk number, block number, and pixel offsets to re-direct read or write access to a pixel in the VFB cache.

The VFB logic allows from none to any number of chunks along a pair of horizontal rows to be cached at any one time. It accomplishes this by keeping the address of the left most chunk in the virtual frame buffer tag store 224 and then storing chunk valid bits for each chunk along the horizontal row including: a readable, writeable, and written (or modified) bit. These chunk valid bits are illustrated by three rows of registers 226, 228, 230 associated with each cache slot: a readable register 226, a writeable register 228, and a written register 230. Each bit in these registers corresponds to one chunk along the horizontal row. Each of the registers is abbreviated in FIG. 13. The number of bits needed to implement each of these registers depends on the number of horizontal chunks in the display image. For example, for 1344×1024 resolution, there are 42 horizontal chunks and therefore, the readable, writeable and written registers include at least 42 bits.

Setting a bit to a one in the readable register 230 indicates that the corresponding chunk is readable from decompressed memory. The VFB logic matches both the cache slot tag 224 and the corresponding chunk valid bit before allowing the PCI read access to complete.

Setting each bit to a one indicates that the corresponding chunk is writeable to decompressed memory. The cache logic matches both the cache slot tag 224 and the corresponding writeable chunk bit before allowing the write access.

To accelerate write operations, the VFB controller allows write operations to the VFB cache without incurring the latency of decompressing the chunk. The VFB cache allows the write to a chunk, and the DSP merges the chunk with its counterpart in the compressed display image and clears the chunk in the cache in the background. The VFB controller enables this approach by marking each pixel written to the VFB cache with an "overwrite" value. Prior to writing a pixel to shared memory, the VFB controller modifies the pixel data by setting the overwrite value in the pixel.

In this implementation, the overwrite value is referred to as the alpha overwrite value because the VFB controller uses alpha bits in the pixel format to encode the value. The VFB controller determines the alpha overwrite value based on the flag stored in an alpha overwrite register. This technique is applicable to pixels in 16 bpp format, which includes a single alpha bit, and 32 bpp format, which includes 8 bits of alpha. The VFB encodes the alpha bit in the pixel to indicate that this pixel should overwrite the corresponding pixel in the compressed chunk. To merge a decompressed chunk with a compressed one, the display controller decompresses the compressed chunk, reads the alpha overwrite bit, and overwrites pixels with pixels in the VFB cache that have the overwrite flag set. The display controller can either display the merged chunk immediately or compress it. Once it has merged a chunk, the display controller clears the corresponding chunk in the cache by resetting the alpha overwrite values.

In this approach, a "writeable" chunk is one that has either been decompressed or one where the alpha overwrite values of all 32×32 pixels have been set to zero. The software executing in the host computer can have write access to the writeable chunks.

The technique for merging pixels and/or subregions applies to pixels that can be encoded with an overwrite flag. Alternative approaches can be used to keep track of overwrite pixels. For example, the VFB controller can maintain a table of overwrite pixels, and then use this table to merge new pixels with their counterparts from the compressed display image.

The VFB logic maintains chunk modified bits (also referred to as written or dirty bits) for each chunk in the cache slot. The VFB logic implements this by using a written bit register 230 for storing a written bit for each chunk along a horizontal row as shown in FIG. 13. The modified bit is set whenever the VFB controller allows a write to any pixel in the corresponding chunk from the PCI bus.

The VFB controller uses these bits to determine if the chunk needs to be compressed and saved back into shared memory or if the chunk has been read only and can be discarded.

To determine whether a VFB access results in a cache hit or miss, the cache logic includes a comparator 232 that compares the vertical chunk number with the vertical tags for both cache slots. The cache hit logic 234 determines whether to allow a cache read or write based on the output of the comparator 232, and the status of the readable or writeable bits for the chunk. The decoder 236 decodes the horizontal chunk number to select the horizontal chunk and specifically, the entry in the readable or writeable bit registers that the cache hit logic should use to determine whether to allow a read or write operation.

For a read operation, the cache hit logic 236 combines the result of the comparator 232 and the readable bit for the chunk with a logic AND operation. Similarly for a write operation, the cache hit logic 236 combines the result of the comparator 232 and the writeable bit for the chunk with a logic AND operation. The result of this operation indicates whether the cache logic should allow the read or write.

Figure 14:
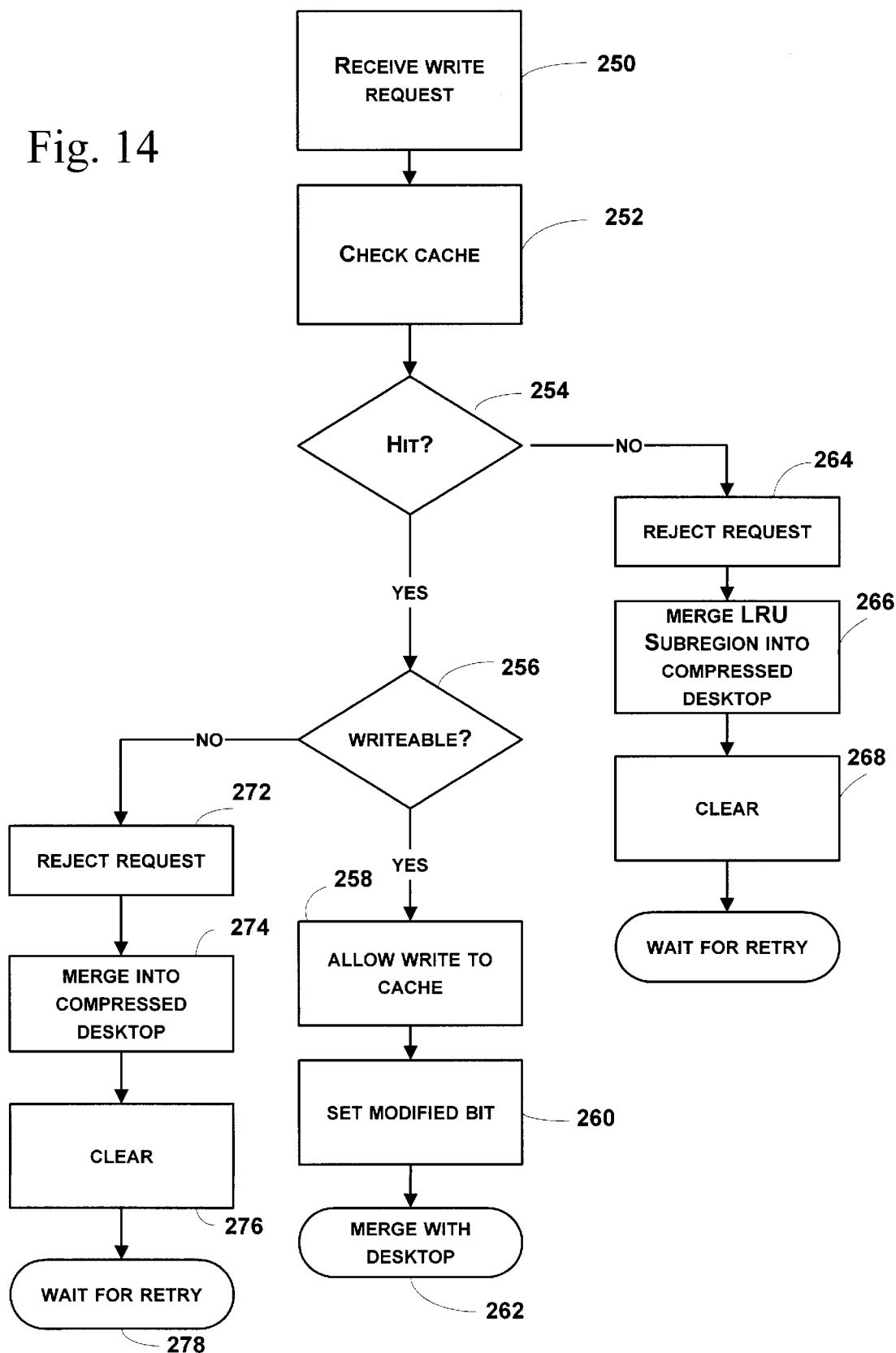
FIG. 14 is a flow diagram illustrating a write operation to a virtual frame buffer in the display controller of FIG. 6.

FIG. 14 is a flow diagram illustrating a write operation in more detail. As we describe the diagram below, we refer to the blocks using reference numerals in parenthesis. When the VFB logic receives a write request (250), it checks the cache slots to determine whether there is a cache hit (252, 254). If there is a cache hit, meaning the VFB cache slot indicates that the chunk containing the requested pixel is active, the cache logic checks whether this active chunk is writeable (256).

If there is a cache hit and the chunk is writeable, the VFB logic allows the write operation to the VFB cache (258). To accomplish this, the VFB controller re-directs the write request to the VFB cache in shared memory via the interface to the shared memory. The VFB logic also sets the modified or written bit for the chunk (260). The written bit tells the DSP that the chunk should not be discarded, but rather, has at least one new pixel that needs to be written to the compressed display image.

In the event that there is no cache hit (254), the VFB controller rejects the write request (264) and proceeds to free memory in the VFB cache so that it can allow the write operation on a subsequent retry. To accomplish this, the VFB controller merges the least recently used (LRU) chunk with the compressed display image (266) and clears this chunk by resetting the alpha overwrite bits (268). The VFB logic then waits for the PCI bus to retry the same write request (270).

If the VFB logic detects a cache hit (254) but finds that the chunk is not writeable (256), it rejects the write request (272). In these circumstances, the VFB controller has to wait for the chunk to become writeable before it can allow the write operation. In this implementation, a chunk may be present in the cache but not writeable while it is being cleaned, e.g., merged with a corresponding chunk from the compressed display image and cleared.

Cleaning the chunk includes merging the un-writeable chunk into the compressed display image (274) and clearing the overwrite bits for the chunk (276). Once the chunk is cleaned, the VFB controller can allow the write operation on a subsequent retry (278).

Figure 15:
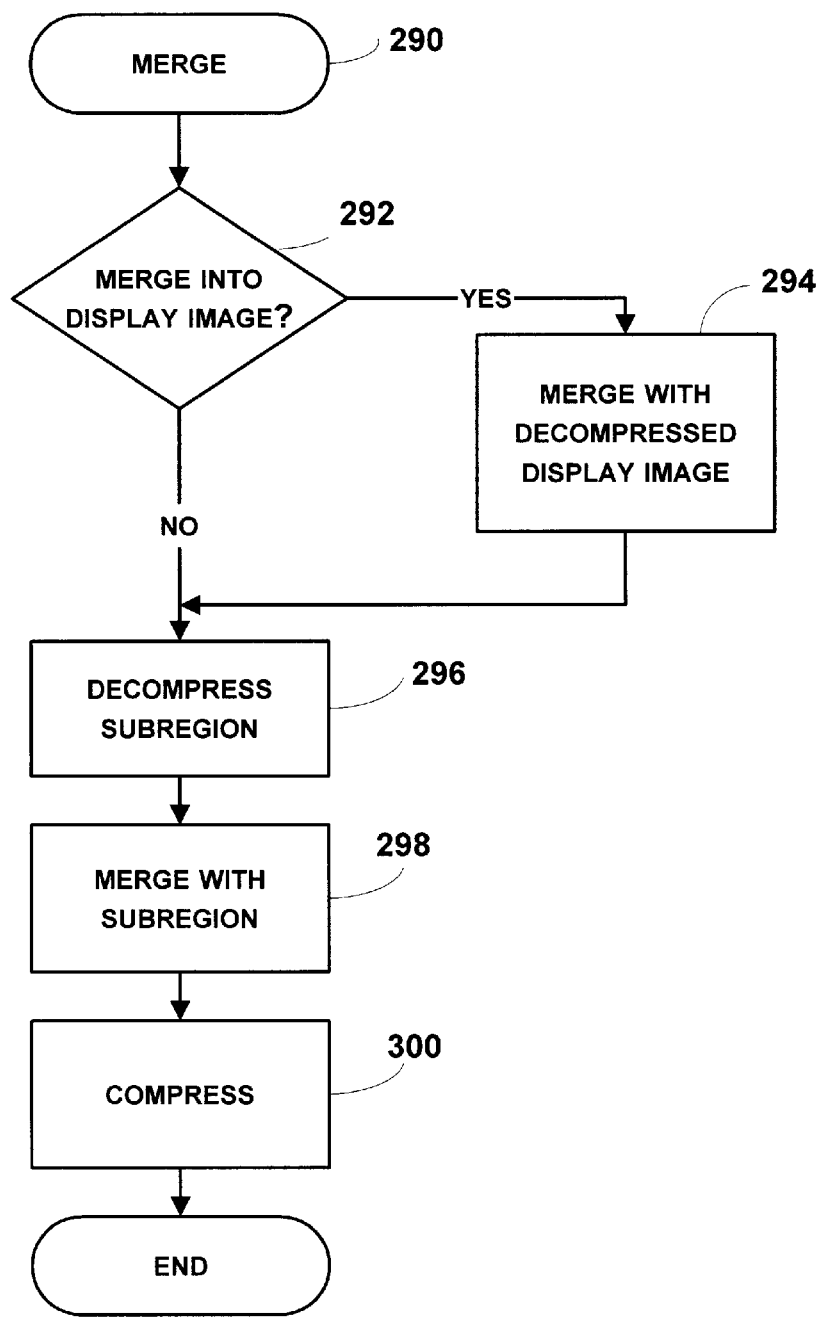
FIG. 15 is a flow diagram illustrating two alternative ways to merge a decompressed chunk with its compressed counterpart.

FIG. 15 is a flow diagram illustrating two alternative ways to merge a decompressed chunk with a corresponding compressed chunk in the display controller of FIG. 6. When the VFB controller directs write requests to the VFB cache, it keeps track of new pixels and eventually writes them to the display image. This approach enables the VFB controller to disguise the latency incurred in decompressing a chunk. We refer to the process of writing pixels to the display image as "merging" in this implementation because the display controller merges a decompressed chunk with a corresponding chunk in the display image. Since the display image is compressed in a compressed frame buffer, the display controller first decompresses the compressed chunk and then selectively writes new pixels into the chunk. While we sometimes refer to merging chunks, it is not necessary to merge entire chunks. Only the new pixels have to be written to the display image to ensure that they become visible on the display screen.

As introduced above, there are two methods to merge pixels in the display controller of FIG. 6: 1) merging pixels in the VFB cache with decompressed chunks in the compositor; and 2) merging pixels in the VFB cache with decompressed chunks in the process of updating the compressed display image. The flow diagram of FIG. 15 illustrates the relationship between these methods in the display controller of FIG. 6.

The VFB controller determines when and how to merge a chunk (290). When requested to make new pixels immediately visible on the display (292), the VFB controller controls the transfer of the chunk from the VFB cache to the compositor. The compositor examines the overwrite flag (alpha value) of each pixel from the decompressed chunk, and if the overwrite flag (alpha value) is set, overwrites the corresponding pixels previously retrieved from the compressed frame buffer (294). With this approach, the VFB controller makes the new pixels immediately visible on the display screen.

Another way to make new pixels visible on the display screen is to merge them with the compressed display image and then decompress and display the display image. As shown in FIG. 15, the VFB controller updates the compressed display image even if it has merged the new pixels with the display image in the compositor. This ensures that the display image in the frame buffer properly updated.

To merge a modified chunk with the compressed display image, the VFB controller instructs the compressor to decompress the corresponding chunk in the compressed memory (296). It then selectively overwrites the decompressed chunk with pixels marked with the overwrite flag (298). This implementation uses alpha bits to store the overwrite flag, but other alternative ways of tracking modified pixels can be used as well, such as maintaining a table of modified pixels and then looking up modified pixels in the table to determine which pixel locations to update in the display image.

While we have specifically described a technique for hiding the latency of decompressing subregions of the compressed display image for pixel writes, it is also possible to simply incur this latency by decompressing a chunk on a cache miss. However, it is desirable to hide this latency if possible to optimize write operations to the compressed display image.

The last step in updating the compressed display image is to compress a merged chunk to make it part of the compressed display image (300). The VFB controller instructs the compressor to compress the merged chunk. In this implementation, the VFB controller uses additional decompressed memory, aside from that available for the cache slots, to compress chunks in the background.

Figure 16:
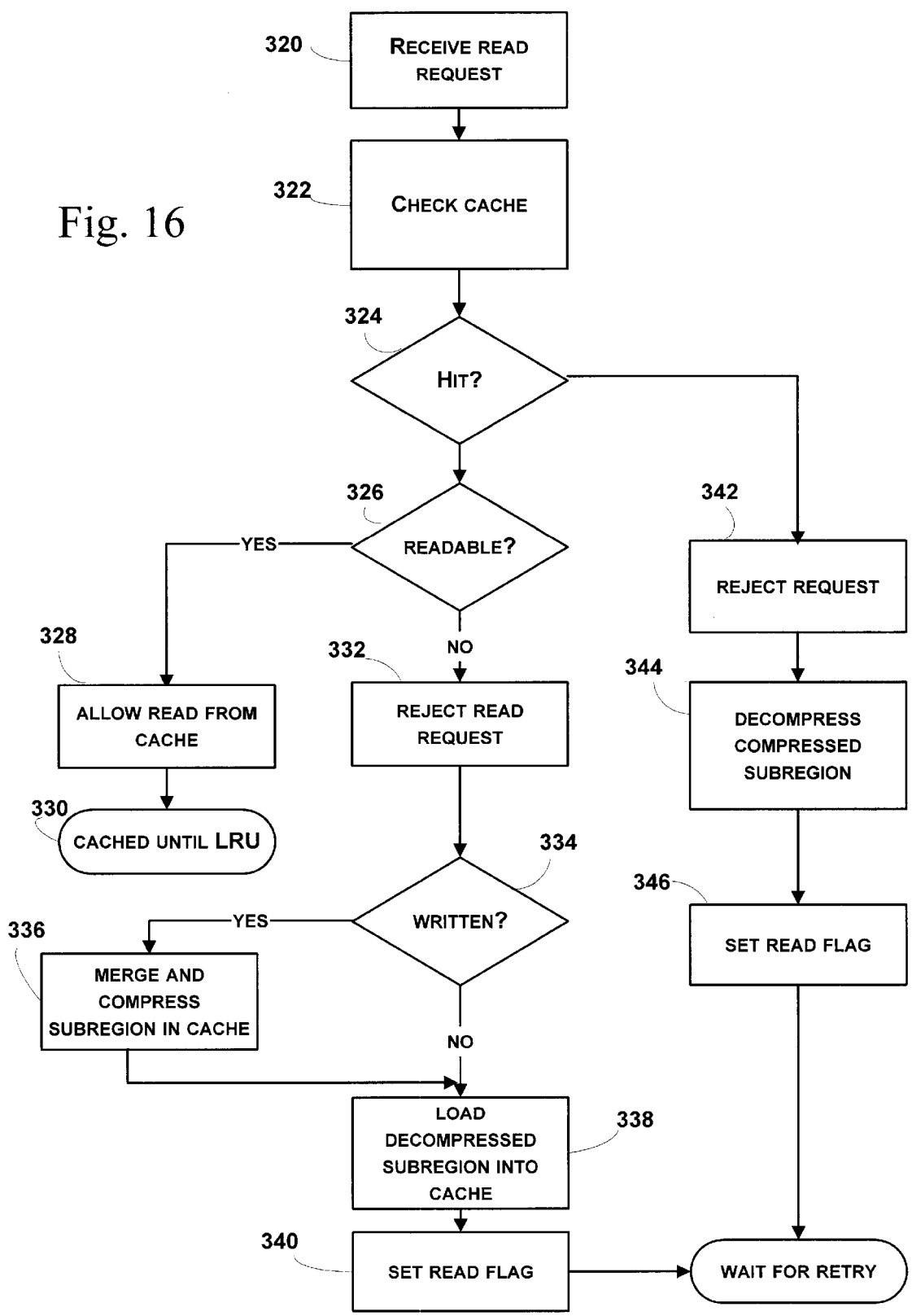
FIG. 16 is a flow diagram illustrating a read operation to a virtual frame buffer in the display controller of FIG. 6.

FIG. 16 is a flow diagram illustrating a method for reading pixels from the VFB cache in the display controller of FIG. 6. When the VFB logic receives a VFB read request from the host (320), it checks the cache to determine whether the cache currently contains the chunk with the requested pixel (322) as described above with reference to FIGS. 9–13.

If there is a cache hit (324), the cache logic also checks whether the chunk is readable (326). If there is a cache hit and the chunk is readable, the VFB controller allows the read operation by directing the read request to the location of the requested pixel in the VFB cache (328). Once a chunk is readable, the VFB controller can decide to discard it at some later time, unless the host also writes pixels to the chunk. If further read or write accesses are anticipated, the VFB should preferably keep the chunk in the cache until it becomes the least recently used (LRU) chunk (330).

If there is a cache hit (324) but the chunk is not readable, the VFB logic rejects the read request (332). If the chunk has been modified (the written bit is set) (334), the VFB logic asks the DSP to clean the chunk first and then retrieve the clean chunk so that it can allow a subsequent read request. Cleaning the chunk includes writing modified pixels to the corresponding chunk from the compressed display image (in other words, merging the chunks) and then compressing the new chunk to make it part of the compressed display image (336). To perform the merge, the display controller decompresses the corresponding chunk from the compressed display image and overwrites selected pixels as described above. Then, the display controller compresses the merged chunk to make it part of the compressed display image.

Finally, to make the chunk readable, the decompressed form of the merged chunk is placed in the cache (338) and the readable and writeable flag is set (340). As noted above, the memory control 156 merges a modified chunk from the VFB cache with a decompressed chunk in the chunk buffer. The memory controller 156 can return the merged chunk to the VFB cache and also buffer the merged chunk as the compressor 154 compresses it.

If on a cache hit, the VFB logic determines that the chunk is not readable and not modified (not written), it raises an interrupt to fetch and decompress the corresponding chunk from the compressed display image (338). It then sets the read flag, once the chunk is placed in the VFB cache (340).

If the VFB logic detects a cache miss (324), it rejects the read request (342), traps the address and raises an interrupt to fetch and decompress the chunk containing the requested pixel. In response to this interrupt, the DSP instructs the compressor to decompress the chunk and transfer it to the VFB cache (344). Once in the cache, the readable and writeable bit are set (346), indicating that the VFB logic can now allow read or write accesses to the chunk.

Compression and Decompression

The system architecture and methods to support a compressed display image described above can use any of a variety of compression and decompression methods. Below, we describe a specific implementation of the compressor and decompressors. It is important to note that the invention is not limited to this implementation.

As noted above, the compressor and decompressor in the display controller of FIG. 6 support both lossy and lossless compression. The compressor performs lossy compression in four or five steps (depending on whether a color space conversion is included):

1. Convert the RGB data input to a YUV-like luminance-chrominance system (optional).
2. Perform a forward, two-dimensional discrete cosine transform (DCT) individually on each color component.
3. Order the two-dimensional DCT coefficients in approximately a monotonically increasing frequency order.
4. Quantize the DCT coefficients: Divide by either a uniform divisor or a frequency-dependent divisor.
5. Encode the resulting coefficients using Huffman encoding with fixed code tables.

Lossy decompression occurs in four or five steps:

1. Decode the compressed data input using Huffman decoding with fixed code tables.
2. Dequantize the compressed data: Multiply by the uniform multiplier or the frequency-dependent multiplier used in the quantization step of compression.
3. Reorder the linear array of data into the proper two-dimensional order for DCT coefficients.
4. Perform an inverse, two-dimensional DCT individually on each color component.
5. Convert the colors in the YUV-like luminance-chrominance system to RGB colors, if the compression process included the corresponding optional step.

We now describe each of these steps in more detail. Color Space Conversion

The color space conversion transforms the RGB colors to a brightness-color system with brightness coordinate Y and color coordinates U and V. This luminance-chrominance system is not a standard color space. Using this system improves the degree of compression because the color coordinates require only a small fraction of the bits needed to compress the brightness. The lossless, reversible conversion applies to each pixel independently and does not change the value of alpha.

RGB to YUV (for compression)

The conversion from integer RGB values to integer YUV values uses this transformation:

$Y=(4R+4G+4B)/3-512$ $U=R-G$ $V=(4B-2R-2G)/3$

YUV to RGB (for decompression)

The conversion from integer YUV values to integer RGB values uses this transformation:

$R=(((Y+512)-V)/2+U+1)/2$ $G=(((Y+512)-V)/2-U+1)/2$ $B=((Y+512)/2+V+1)/2$

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in FIGS. A.1.1 and A. 1.2 in Discrete Cosine Transform. Rao, K. R., and P. Yip. San Diego: Academic Press, Inc., 1990.

The two-dimensional DCT produces a two-dimensional array of coefficients for the frequency domain representation of each color component. Zigzag ordering rearranges the coefficients so that low DCT frequencies tend to occur at low positions of a linear array. In this order, the probability of a coefficient being zero is approximately a monotonically increasing function of the position in the linear array (as given by the linear index). This ordering simplifies perceptual quantization and LOD filtering and also significantly improves the performance of the run-length encoding (RLE).

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (index=0), but instead passes it along unaltered.

The quantization process begins with the specification of the quantization factor (QFactor) for an image or portion of an image. In this implementation, a Qfactor is specified for a 32×32 pixel chunk. A quantization index (QIndex) specifies a corresponding quantization factor (QFactor) to use for the chunk. The following table shows the relationship between QIndex and Qfactor.

| | Quantization Factor | | |
|---|---|---|---|
| QIndex | QFactor | QIndex | QFactor |
| 0 | 2 | 8 | 32 |
| 1 | 3 | 9 | 48 |
| 2 | 4 | 10 | 64 |
| 3 | 6 | 11 | 96 |
| 4 | 8 | 12 | 128 |
| 5 | 12 | 13 | 192 |
| 6 | 16 | 14 | 256 |
| 7 | 24 | 15 | 4096 |

Each color plane has a different value for the chunk Qindex. A QIndex of 15 selects a QFactor of 4096, which produces zeros during quantization and inverse quantization. The quantization process divides each coefficient in a block by a QFactor and rounds it back to an integer. The inverse quantization process multiplies each coefficient by a QFactor. Quantization and inverse quantization do not change the DC frequency component.

Block Quantization Factor The QIndex, and thus the QFactor, can vary from block to block (8×8 pixels). The QIndex for a block results from incrementing the QIndex for the chunk with a value embedded in the block compression type:

Block QIndex=Chunk QIndex+(Block Compression Type−3)

This increments the chunk QIndex by one, two, three, or four. Because the largest possible QIndex value is 15, any incremented value greater than 15 is set to 15.

The QIndex, and thus the QFactor, can also vary from coefficient to coefficient (from array index to array index) if the quantization type is perceptual.

For uniform quantization, the coefficient QIndex is equal to the block QIndex, so the corresponding QFactor either multiplies (inverse quantization) or divides (quantization) each coefficient in the block.

For perceptual quantization, the coefficient QIndex depends on the value (0 . . . 63) of the index in the linear array. The following table gives the resulting coefficient QIndex as a function of the array index value.

| Coefficient QIndex | Array Index |
|---|---|
| Block QIndex | index < 12 |
| Block QIndex + 1 | 12 ≤ index < 28 |
| Block QIndex + 2 | 28 ≤ index < 52 |
| Block QIndex + 3 | 52 ≤ index |

Entropy Coding

Huffman/RLE coding processes the linear array of quantized DCT coefficients by:

1. Independently encoding non-zero coefficients with the fewest possible bits (because the DCT coefficients are uncorrelated).
2. Optimally encoding continuous "runs" of coefficients with zero values-especially at the end of the linear array (because of the zigzag ordering).

One suitable approach for the Huffman/RLE coding process is the Huffman/RLE coding process used for the AC coefficients in the well known JPEG still image compression standard.

To enable random access of blocks, this particular approach does not encode the DC frequency coefficient (index=0), but instead passes it on unaltered. The algorithm computes a series of variable-length code words, each of which describes:

1. The length, from zero to 15, of a run of zeros that precedes the next non-zero coefficient.
2. The number of additional bits required to specify the sign and mantissa of the next non-zero coefficient.

The sign and mantissa of the non-zero coefficient follows the code word. One reserved code word signifies that the remaining coefficients in a block are all zeros.

Encoding

The encoding of all blocks uses the typical Huffman tables for AC coefficients from Annex K, section K.3.2 of ISO International Standard 10918. This includes Table K.5 for the luminance (Y) AC coefficients and Table K.6 for the chrominance (U and V) AC coefficients.

Decoding

The decoding of all blocks uses the same fixed tables as the encoding process. Therefore, it is never necessary to store or to convey the Huffman tables with the data.

Lossless Compression\Decompression

In one implementation of the compressor illustrated in FIG. 6, lossless compression occurs in two or three steps:

1. Convert incoming RGB data to a YUV-like luminance-chrominance system (optional).
2. Perform a differential prediction calculation on each color component.
3. Encode the resulting coefficients using Huffman encoding with fixed code tables.

Lossless decompression in one implementation of the decompressors of FIG. 6 occurs in two or three steps:

1. Decode the incoming compressed data using Huffman decoding with fixed code tables.
2. Perform an inverse, differential prediction (reconstruction) on each color component.
3. Convert the colors in the YUV-like luminance-chrominance system to RGB colors if the compression process included this corresponding optional step.

Color Space Conversion

The color space conversion reversibly transforms the RGB colors to a brightness-color system with brightness coordinate Y and color coordinates U and V. This is a unique color space that improves the degree of compression even more than the YUV system above because the numbers entering the Huffman/RLE encoder are smaller, and hence more compressible. The color space conversion applies to each pixel independently and does not change the value of alpha.

RGB to YUV (for compression)

The conversion from integer RGB values to integer YUV values uses this transformation:

Y=G
U=R−G
V=B−G

YUV to RGB (for decompression)

The conversion from integer YUV values to integer RGB values uses this transformation:

R=Y+U
G=Y
B=Y+V

Alpha information is not altered during the color space transform.

The color space transform can be bypassed. The decompressor is notified in cases where the color transform is bypassed by a flag in a control data structure used to store control parameters for the display image.

The prediction stage occurs after the color space transform. Prediction is a losslessly invertible step that reduces the entropy of most source images, particularly images with lots of blank space and horizontal and vertical lines.

In the prediction stage of compression and the inverse prediction stage of decompression:

1. p(x, y) are the pixel values input to the compressor and output from the decompressor; and
2. d(x, y) are the difference values input to the coder in the next stage of the compression engine and output from the inverse of the coder in the decompressor.

Prediction is computed as follows:

$$d(x, y) = p(x, y) \quad \text{for } x = 0, y = 0$$
$$d(x, y) = p(x, y) - p(x, y-1) \quad \text{for } x = 0, y > 0$$
$$d(x, y) = p(x, y) - p(x-1, y) \quad \text{for } x > 0$$

Inverse prediction in the decompressor is computed as follows:

$$p(x, y) = d(x, y) \quad \text{for } x = 0, y = 0$$
$$p(x, y) = p(x, y-1) + d(x, y) \quad \text{for } x = 0, y > 0$$
$$p(x, y) = p(x-1, y) + d(x, y) \quad \text{for } x > 0$$

The Huffman/RLE coding and decoding is the same as for the lossy form of decompression/decompression in this implementation.

The compression methods described above compress images in independent blocks of 8×8 pixels. Therefore, each compressed 32×32 pixel chunk consists of 16 such blocks.

The VFB controller maintains a header structure to keep track of each compressed chunk in the display image. This header structure keeps a list of the chunks that comprise the display image. To display the compressed image, the VFB controller passes the header structure to the compositor, which uses the structure to fetch the compressed chunks from shared memory, decompress the chunks, and construct a decompressed display image. Instead of using a complete frame buffer, the compositor uses a compositing buffer that holds a horizontal row of chunks. The DAC scans pixels from this buffer and converts them to a form compatible with the display monitor.

In one implementation, this list of chunks comprises a list of pointers to chunk control blocks. These chunk control blocks include per chunk and per block parameters. The per chunk parameters include a YUV color converter bypass, default Q factors, a perceptual quantization flag, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU.

The per block parameters in this implementation include compression type, number of MAUs the block spans, and a block pointer pointing to the first byte of pixel data for the block.

While we have describe specific implementations in detail, we do not intend to limit the scope of our invention to these implementations. The invention can be implemented in a variety of computer and hardware architectures. For example, rather than implementing the VFB controller with a DSP and VFB logic, it can be implemented in software executing in the host computer. As another example, the architecture of the display controller can vary and can include architectures where the VFB cache and compressed cache are implemented in main memory of the host or in a separate memory unit in a plug in display controller or display controller chip.

In another alternative implementation, a compressor/decompressor pair is located between the source of the frame buffer read write requests 82 and compressed display image 78. This compressor/decompressor pair is either an additional compressor/decompressor pair to the compressor and decompressor 76, 74 shown in FIG. 3, or uses the same pair by time sharing the resources of the compressor and decompressor 76, 74. This additional pair of decompressor and compressor can reduce the virtual frame buffer logic to only logic needed to keep track of which portions of the display image are compressed or decompressed, as opposed to logic used to determine whether a subregion is readable or writeable.

If the display image is always maintained in compressed form, then there is no need to keep track of which portions are decompressed and compressed because a portion of the display image needed to satisfy a read or write request always has to be decompressed in this case.

The specific format of the virtual frame buffer and the compressed subregions of the display image can vary as well and are not limited to the specific format of 32×32 pixel chunks or 8×8 pixel blocks described in the specification. For instance, a compressed subregion can be virtually any sized block of pixels or a scanline of pixels.

The compression and decompression techniques can vary as well. There is an advantage to supporting lossy and lossless forms of compression. Lossless compression is more effective for typical desktop applications such as spreadsheets and word processors used on PCs, while lossy compression is more effective on more sophisticated graphics and realistic images. However the approaches for supported a compressed display image described here are not specific to any type of compression. The compression used here enables varying compression ratio per block or per chunk and produces variable sized compressed blocks of data. These features, however, are not necessary to implement the invention.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A compressed display image controller comprising:
   a compressed memory for storing compressed subregions of a display image;
   a cache for storing decompressed subregions of the display image;
   a compressor in communication with the cache for compressing the decompressed subregions of the display image stored in the cache;
   a decompressor in communication with the compressed memory for decompressing a compressed subregion of the display image, and in communication with the cache for placing the decompressed subregion in the cache; and
   a virtual frame buffer controller in communication with the cache for receiving an access request for a pixel in the display image, for determining whether the pixel is in the cache, and if not, for issuing a request to the decompressor to decompress a compressed subregion including the pixel; and
   a compositor in communication with the compressed memory for decompressing the compressed subregions of the display image and for buffering at least a portion of the decompressed display image as the decompressed display image is being read to refresh a display monitor.

2. The controller of claim 1 wherein the virtual frame buffer controller presents a linear address space to allow random access to each pixel in the compressed display image.

3. The controller of claim 2 wherein the compressed desktop display image is comprised of variable sized compressed subregions.

4. The controller of claim 3 wherein the decompressor decompresses the variable sized compressed subregions using a lossless form of decompression.

5. The controller of claim 3 wherein the decompressor decompresses the variable sized compressed subregions using a lossy form of decompression.

6. The controller of claim 1 wherein the virtual frame buffer controller includes virtual frame buffer logic in communication with a digital signal processor.

7. The controller of claim 1 wherein the virtual frame buffer controller comprises a series of software instructions executing on a computer in communication with the cache and compressed memory.

8. The controller of claim 1 wherein the compressed subregions comprise variable sized compressed subregions.

9. A method for accessing a compressed display image comprising:
   receiving an access request to access a pixel at a pixel location in a linear addressed frame buffer;
   storing a decompressed portion of the linear addressed frame buffer in a cache;
   storing a compressed portion of the linear addressed frame buffer in compressed memory;
   in response to the access request, determining whether the pixel is in the cache;
   fetching a compressed subregion having the pixel when the pixel is not in the cache;
   decompressing the compressed subregion; and
   allowing the access of the pixel to occur.

10. The method of claim 9 including repetitively rejecting the access request until the compressed subregion is fetched and decompressed.

11. The method of claim 9 wherein the access request is a write request; and further including:
    writing a new pixel into the cache; and
    after writing the new pixel to the cache, decompressing the compressed region, and merging the new pixel into the decompressed subregion.

12. The method of claim 11 wherein the merging step comprises merging the new pixel in the cache with a decompressed subregion of the frame buffer including the pixel location; and
    compressing the decompressed subregion including the merged pixel from the merging step;

decompressing the compressed subregion including the merged pixel; and displaying the merged pixel.

13. The method of claim 11 wherein the merging step comprises merging the new pixel in the cache with a decompressed pixel; and displaying the merged pixel.

14. The method of claim 9 wherein the access request is a read request, and wherein the read request is allowed only after the pixel is in the cache.

15. A method for emulating a linear addressed frame buffer comprising:

storing variable sized, compressed subregions of a display image;

storing a decompressed portion of the display image in a cache;

receiving a request to access a pixel in the display image in a linear address format; and determining whether the requested pixel is in the decompressed portion, and if so, directing the request to a location of the pixel in the cache, and if not, rejecting the request, and decompressing a compressed subregion including the pixel and placing the decompressed subregion in the cache.

16. The method of claim 15 wherein the request to access the pixel is a write request; and further including:

writing a new pixel to the cache;

associating the new pixel with an overwrite flag;

repeating the writing and associating steps;

decompressing a compressed subregion including pixel locations corresponding to the new pixels in the cache; and selectively overwriting the new pixels into the decompressed subregion.

17. The method of claim 15 further including:

decompressing the compressed subregions; and converting the decompressed subregions into control signals used to make the display image visible on a display monitor.

18. The method of claim 15 wherein the variable sized compressed subregions are compressed using a lossless form of compression.

19. The method of claim 15 wherein the variable sized compressed subregions are compressed using a lossy form of compression.

20. The method of claim 18 wherein the lossless form of compression includes compressing blocks of the display image using Huffman and run length coding.

* * * * *

UNITED STATES PATENT AND TRADEMARK OFFICE
CERTIFICATE OF CORRECTION

PATENT NO. : 5,936,616
DATED : August 10, 1999
INVENTOR(S) : Torborg, Jr. et al.

It is certified that error appears in the above-identified patent and that said Letters Patent is hereby corrected as shown below:

Drawings,
Fig. 7, "800 x 768" should be -- 800 x 600 --;

Column 8,
Line 54, "Windows 95 Operating" should be -- Windows 95 Operating --.

Column 10,
Line 35, "8x8block" should be -- 8x8 block --.

Column 12,
Line 54, "21:0" should be -- 21:0 --.
Line 57, "21:16" should be -- 21:16 --.
Line 61, "21:16" should be -- 21:16 --.
Line 64, "15:14" should be -- 15:14 --.
Line 64, "4:3" should be -- 4:3 --.

Signed and Sealed this

Thirtieth Day of October, 2001

Attest:

NICHOLAS P. GODICI
Attesting Officer    Acting Director of the United States Patent and Trademark Office